US012569971B2

(12) United States Patent
Bourret

(10) Patent No.: US 12,569,971 B2
(45) Date of Patent: Mar. 10, 2026

(54) ANGLED TOOL ACCESSORY HOLDER

(71) Applicant: BLACK & DECKER INC., New Britain, CT (US)

(72) Inventor: Anthony Y. Bourret, Millersville, MD (US)

(73) Assignee: BLACK & DECKER INC., New Britain, CT (US)

( * ) Notice: Subject to any disclaimer, the term of this patent is extended or adjusted under 35 U.S.C. 154(b) by 41 days.

(21) Appl. No.: 18/421,899

(22) Filed: Jan. 24, 2024

(65) Prior Publication Data

US 2024/0253200 A1 Aug. 1, 2024

Related U.S. Application Data

(60) Provisional application No. 63/481,861, filed on Jan. 27, 2023.

(51) Int. Cl.
| | |
|---|---|
| *B25F 3/00* | (2006.01) |
| *B23B 45/00* | (2006.01) |
| *B25F 5/00* | (2006.01) |
| *B25B 23/00* | (2006.01) |
| *B25B 23/18* | (2006.01) |

(52) U.S. Cl.
CPC .............. *B25F 3/00* (2013.01); *B23B 45/003* (2013.01); *B25F 5/006* (2013.01); *B25B 23/0021* (2013.01); *B25B 23/0028* (2013.01); *B25B 23/0035* (2013.01); *B25B 23/18* (2013.01)

(58) Field of Classification Search
USPC ........................................................ 173/46
See application file for complete search history.

(56) References Cited

U.S. PATENT DOCUMENTS

| | | | |
|---|---|---|---|
| 2,038,911 A | 4/1936 | Stutz et al. | |
| 2,466,342 A | 4/1949 | Watts | |
| 4,230,453 A | 10/1980 | Reimers | |
| 6,116,746 A | 9/2000 | Hsu | |

(Continued)

FOREIGN PATENT DOCUMENTS

| | | |
|---|---|---|
| DE | 3831344 A1 | 3/1990 |
| DE | 102009011423 A1 | 9/2010 |

(Continued)

OTHER PUBLICATIONS

Extended European Search Report, EP Application No. 24154147.3, Jun. 24, 2024, 7 pages, EPO.

*Primary Examiner* — Chinyere J Rushing-Tucker
(74) *Attorney, Agent, or Firm* — Scott B. Markow

(57) ABSTRACT

An angled tool accessory holder includes a housing; an input shaft extending along a first axis and at least partially received in the housing, the input shaft coupleable to an output tool holder of a rotary power tool to be rotatable relative to the housing; a tool accessory holder rotatable relative to the housing and extending along a second axis transverse to the first axis; a transmission configured to transmit torque from the input shaft to the tool accessory holder; and a light assembly received in the housing, the light assembly including a light configured to illuminate a workpiece adjacent the tool accessory holder, a battery configured to power the light, and a vibration damping member configured to dampen vibrations between the housing and the light assembly.

20 Claims, 23 Drawing Sheets

(56) References Cited

U.S. PATENT DOCUMENTS

| | | | |
|---|---|---|---|
| 6,283,606 | B1 | 9/2001 | Wei et al. |
| 6,283,607 | B1 | 9/2001 | Lin |
| 6,379,019 | B1 | 4/2002 | Lin |
| 6,386,727 | B1 | 5/2002 | Yeh |
| 6,454,429 | B1 | 9/2002 | Liao |
| 6,497,494 | B1 | 12/2002 | Lin |
| 6,568,825 | B2 | 5/2003 | Chang |
| 7,137,761 | B2 | 11/2006 | Hara et al. |
| 7,307,230 | B2 | 12/2007 | Chen |
| 7,677,752 | B2 | 3/2010 | Tadokoro et al. |
| 7,740,369 | B2 | 6/2010 | Gabriel et al. |
| 7,878,090 | B2 | 2/2011 | Leupert |
| 8,038,439 | B2 | 10/2011 | Schatz et al. |
| 8,317,350 | B2 | 11/2012 | Friedman et al. |
| 8,328,381 | B2 | 12/2012 | Dixon et al. |
| 8,506,108 | B2 | 8/2013 | Friedman et al. |
| 8,820,955 | B2 | 9/2014 | Dixon et al. |
| 8,827,483 | B2 | 9/2014 | Dixon et al. |
| 9,352,458 | B2 | 5/2016 | Friedman et al. |
| 9,539,691 | B2 | 1/2017 | Hirschburger |
| 10,052,733 | B2 | 8/2018 | Ely et al. |
| 10,174,934 | B2 | 1/2019 | Padget et al. |
| 10,207,380 | B2 | 2/2019 | Billings et al. |
| 10,220,501 | B1 | 3/2019 | Davidson |
| 10,486,291 | B2 | 11/2019 | Bartoszek |
| 10,525,582 | B2 | 1/2020 | Qiu et al. |
| 10,821,595 | B2 | 11/2020 | Qiu et al. |
| 10,960,509 | B2 | 3/2021 | Ely et al. |
| 11,213,937 | B1 | 1/2022 | Rajzer et al. |
| 11,338,413 | B2 | 5/2022 | Zhao |
| 11,453,106 | B2 | 9/2022 | Kelly et al. |
| 2002/0097572 | A1 | 7/2002 | Yeh |
| 2011/0188232 | A1 | 8/2011 | Friedman et al. |
| 2014/0036482 | A1* | 2/2014 | Vanko ................. F21V 33/0084 362/119 |
| 2015/0251299 | A1* | 9/2015 | Fu ........................... B25F 5/021 362/119 |
| 2016/0052112 | A1 | 2/2016 | Lemley, Jr. |
| 2018/0147686 | A1 | 5/2018 | Valentini |
| 2018/0229350 | A1* | 8/2018 | Naoi .................... B25B 21/002 |
| 2020/0353605 | A1* | 11/2020 | Kaye, Jr. ............. B25B 23/0028 |
| 2022/0168878 | A1* | 6/2022 | Zufelt ................ B25B 13/5083 |
| 2022/0241936 | A1 | 8/2022 | Zhao |
| 2022/0281094 | A1* | 9/2022 | Williams .................. F21S 9/02 |
| 2023/0147598 | A1 | 5/2023 | Tamura et al. |
| 2024/0123590 | A1* | 4/2024 | Abbott ..................... B25F 3/00 |

FOREIGN PATENT DOCUMENTS

| | | |
|---|---|---|
| DE | 102012224448 A1 | 7/2014 |
| DE | 102020201946 A1 | 8/2021 |
| JP | 2002154065 A | 5/2002 |
| WO | 2004048045 A1 | 6/2004 |
| WO | 2023086237 A1 | 5/2023 |

* cited by examiner

600

800

100

112

ANGLED TOOL ACCESSORY HOLDER

RELATED APPLICATIONS

This application claims priority, under 35 U.S.C. § 119(e) to U.S. Provisional Patent Application No. 63/481,861, filed Jan. 27, 2023, titled "Angled Tool Accessory Holder," which is incorporated by reference in its entirety. The following patent applications are also incorporated by reference in their entirety: U.S. patent application Ser. No. 16/858,896, filed Apr. 27, 2020, now U.S. Pat. No. 11,534,897, titled "Modular Tool Accessory Holder System" and U.S. Provisional Application No. 62/845,363, filed May 9, 2019, titled "Modular Tool Accessory Holder System."

TECHNICAL FIELD

This application relates to an angled tool accessory holder and a modular tool accessory holder system.

BACKGROUND

Tool accessory holders, such as angled tool accessory holders, flexible shaft tool accessory holders, and quick release tool accessory holders, may be used with power tools to enhance their functionality in driving tool accessories, such as drill bits, screwdriver bits, sockets, and other fastening tool accessories. These tool accessory holders may enable users to access various workpiece regions. When using these tool accessory holders, a user may have difficulty seeing the workpiece region.

SUMMARY

In an aspect, an angled tool accessory holder includes a housing; an input shaft extending along a first axis and at least partially received in the housing and coupleable to an output tool holder of a rotary power tool; a tool accessory holder coupled to the housing and extending along a second axis transverse to the first axis; a set of gears configured to transmit torque from the input shaft to the tool accessory holder; and an insert received in a cavity in the housing and a light assembly coupled to the insert. The light assembly includes a light configured to illuminate a workpiece adjacent the tool accessory holder. The insert is configured to dampen vibrations between the input shaft and housing, and the light assembly.

Implementations of this aspect may include one or more of the following features. The light assembly may include a circuit board coupled to the insert and the light may include a LED coupled to the circuit board. The light assembly may further include a circuit board cover received over the LED and configured to allow light from the LED to illuminate the workpiece. The circuit board cover may be transparent or translucent. The circuit board cover may include an opening through which the LED illuminates the workpiece. The light assembly may include a switch for turning on and off the light. The light assembly may include a timer for turning off the light a predetermined time after the light is turned on by actuation of the switch. The light assembly may include a battery. The battery may be rechargeable. The light assembly may include a charging port configured to receive a power cable to charge the battery. The battery may be received in a pocket inside the insert. The battery may include a prismatic battery. The vibration damping member may include an insert received in a cavity in the housing. The insert may be composed of an elastomeric material. The elastomeric material may comprise a rubber, a polymer, a composite, or a plastic material. The insert may include a U-shaped opening that receives at least a portion of the input shaft. The insert may be configured to act as a seal for electronic components of the light assembly. The vibration damping member may include a gasket between the light assembly and the housing. The vibration damping member may comprise a potting compound (e.g., epoxy) filling a cavity in which the light assembly is received.

In another aspect, an angled tool accessory holder includes a housing and an input shaft extending along a first axis and at least partially received in the housing. The input shaft is coupleable to an output tool holder of a rotary power tool to be rotatable relative to the housing. A tool accessory holder is rotatable relative to the housing and extends along a second axis transverse to the first axis. A transmission is configured to transmit torque from the input shaft to the tool accessory holder. A light assembly is received in the housing, the light assembly including a light configured to illuminate a workpiece adjacent the tool accessory holder and a vibration damping member configured to dampen vibrations between the housing and the light assembly.

In another aspect, an angled tool accessory holder includes a housing and an input shaft extending along a first axis and at least partially received in the housing. The input shaft is coupleable to an output tool holder of a rotary power tool to be rotatable relative to the housing. A tool accessory holder is rotatable relative to the housing and extends along a second axis transverse to the first axis. A transmission is configured to transmit torque from the input shaft to the tool accessory holder. A light assembly is received in the housing, the light assembly including a light configured to illuminate a workpiece adjacent the tool accessory holder. A battery is received in the housing and configured to provide power to the light. A charging port is configured to configured to receive a power cable to charge the battery while the battery remains received in the housing.

In another aspect, a tool accessory holder system includes an angled tool accessory holder and a flexible orientation tool bit holder. The angled tool accessory holder may include a housing, a rotatable first input shaft extending along a first axis and at least partially received in a rear end portion of the housing, a first connector non-rotationally coupled to the rear end portion of the housing, a first tool accessory holder rotatable relative to the housing and extending along a second axis transverse to the first axis, a transmission configured to transmit torque from the input shaft to the tool accessory holder, and a light assembly received in the housing and including a light configured to illuminate a workpiece adjacent the first tool accessory holder. The flexible orientation tool bit holder may include a second connector selectively non-rotatably coupleable to the first connector, a second rotatable input shaft rotatable relative to the second connector, a flexible intermediate shaft bendable into a plurality of configurations and rotatably drivable by the input shaft, and a second tool accessory holder rotatably drivable by the intermediate shaft. The system is operable in (a) a first configuration in which the angled tool accessory holder is operable without the flexible orientation tool bit holder to drive a first tool accessory coupled to the first tool accessory holder by coupling the first input shaft to a rotatable output member of a power tool, (b) a second configuration in which the flexible orientation tool bit holder is operable without the angled tool accessory holder to drive a second tool accessory coupled to the second tool accessory holder by coupling the second input shaft to a rotatable output member of a power tool, and (c) a third configuration in which the angled tool accessory holder and the flexible orientation tool bit holder are operable in combination to drive a third tool accessory coupled to the first tool accessory holder by coupling the second input shaft to a rotatable output member of a power tool, coupling the first input shaft to the second tool accessory holder, and non-rotatably coupling the first connector and the second connector.

In another aspect, the tool accessory holder system may further include an extension handle including a grip, a third connector selectively non-rotatably coupleable to the first connector, a third rotatable input shaft rotatable relative to the third connector, and a third tool accessory holder rotatably drivable by the intermediate shaft. The may be further operable in a fourth configuration in which the angled tool accessory holder and the handle extension are operable in combination to drive a fourth tool accessory coupled to the first tool accessory holder by coupling the third input shaft to a rotatable output member of a power tool, coupling the first input shaft to the third tool accessory holder, and non-rotatably coupling the first connector and the third connector.

In another aspect, the tool accessory holder system may further include a side handle assembly including a collar with a fourth connector selectively non-rotatably coupleable to the first connector and a side handle coupleable to the collar. The system may be further operable in a fifth configuration in which the angled tool accessory holder and the side handle assembly are operable in combination to drive a fifth tool accessory coupled to the first tool accessory holder by non-rotatably coupling the first connector and the fourth connector and coupling the first input shaft to a rotatable output member of a power tool.

Implementations of any of the foregoing aspects may include one or more of the following features. The light assembly may include a circuit board coupled to an insert and the light may include a LED coupled to the circuit board. The light assembly may further include a circuit board cover received over the LED and configured to allow light from the LED to illuminate the workpiece. The circuit board cover may be transparent or translucent. The circuit board cover may include an opening through which the LED illuminates the workpiece. The light assembly may include a switch for turning on and off the light. The light assembly may include a timer for turning off the light a predetermined time after the light is turned on by actuation of the switch. The light assembly may include a battery. The battery may be rechargeable. The light assembly may include a charging port configured to receive a power cable to charge the battery. The battery may be received in a pocket inside the insert. The battery may include a prismatic battery. The vibration damping member may include an insert received in a cavity in the housing. The insert may be composed of an elastomeric material. The elastomeric material may comprise a rubber, a polymer, a composite, or a plastic material. The insert may include a U-shaped opening that receives at least a portion of the input shaft. The insert may be configured to act as a seal for electronic components of the light assembly. The vibration damping member may include a gasket between the light assembly and the housing. The vibration damping member may comprise a potting compound (e.g., epoxy) filling a cavity in which the light assembly is received.

Additional implementations of any of the foregoing aspects may include one or more of the following features. The light assembly may include a cover received configured to allow the light to illuminate the workpiece. The cover may include at least a portion that is transparent or translucent through which the light illuminates the workpiece. The cover may include an opening, a clear cover, or a lens through which the light illuminates the workpiece. The light assembly may include a switch for turning on and off the light. The light assembly may include a timer for turning off the light a predetermined time after the light is turned on. A battery may be configured to provide power to the light. The light assembly may include a charging port configured to receive a power cable to charge the battery. The vibration damping member nay comprise an elastomeric insert received in the housing. The insert may include a pocket configured to receive a battery that is configured to provide power to the light. The light assembly may include a circuit board to which the light is mounted and the insert includes a recess configured to receive the circuit board. The insert may include an opening that receives at least a portion of the input shaft. The opening may be U-shaped or O-shaped. The vibration damping member may comprise a gasket that at least partially surrounds the light assembly. The housing may include a cavity in which the light assembly is received and the vibration damping member may comprise potting compound configured to fill the cavity around the light assembly. A first connector may be non-rotatably coupled to a rear end portion of the housing, the first connector configured to be removably and non-rotatably couplable at least one of a second connector of a flexible shaft bit holder, a third connector of an extension handle, or a fourth connector of a side handle assembly.

Advantages may include one or more of the following. The light assembly may allow a user to better see a workpiece upon which a tool accessory is acting. The insert may inhibit vibrations and may act as a seal between electronic components and the external surroundings, and may help keep grease, dust, water, and other debris away from the electronic components. The light features an auto-off feature to prevent the battery from draining if left on. These and other advantages and features will be apparent from the description, the drawings, and the claims.

DETAILED DESCRIPTION

Figure 1:
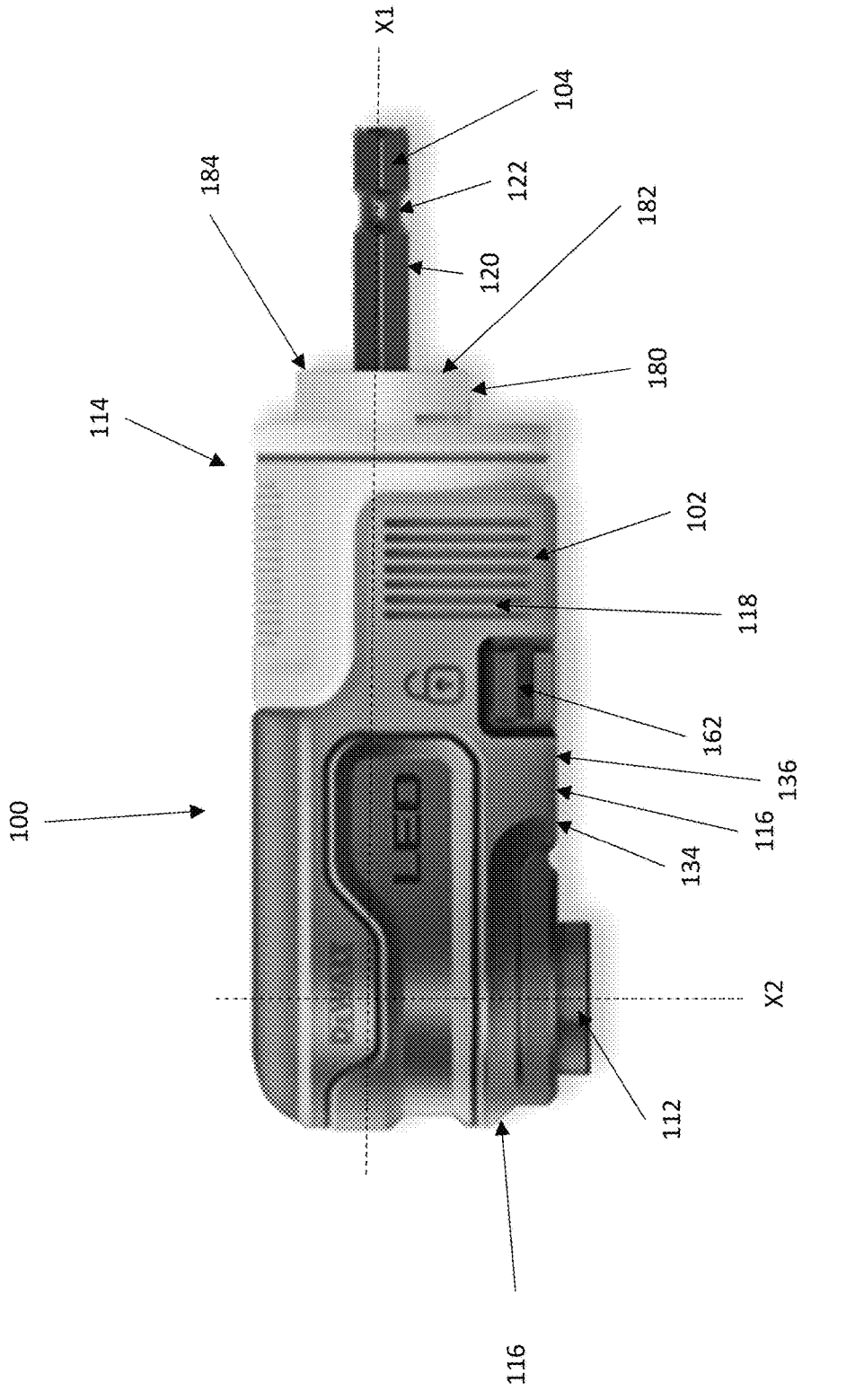
FIG. 1 is a side view of an example implementation of an angled tool accessory holder.
Figure 2:
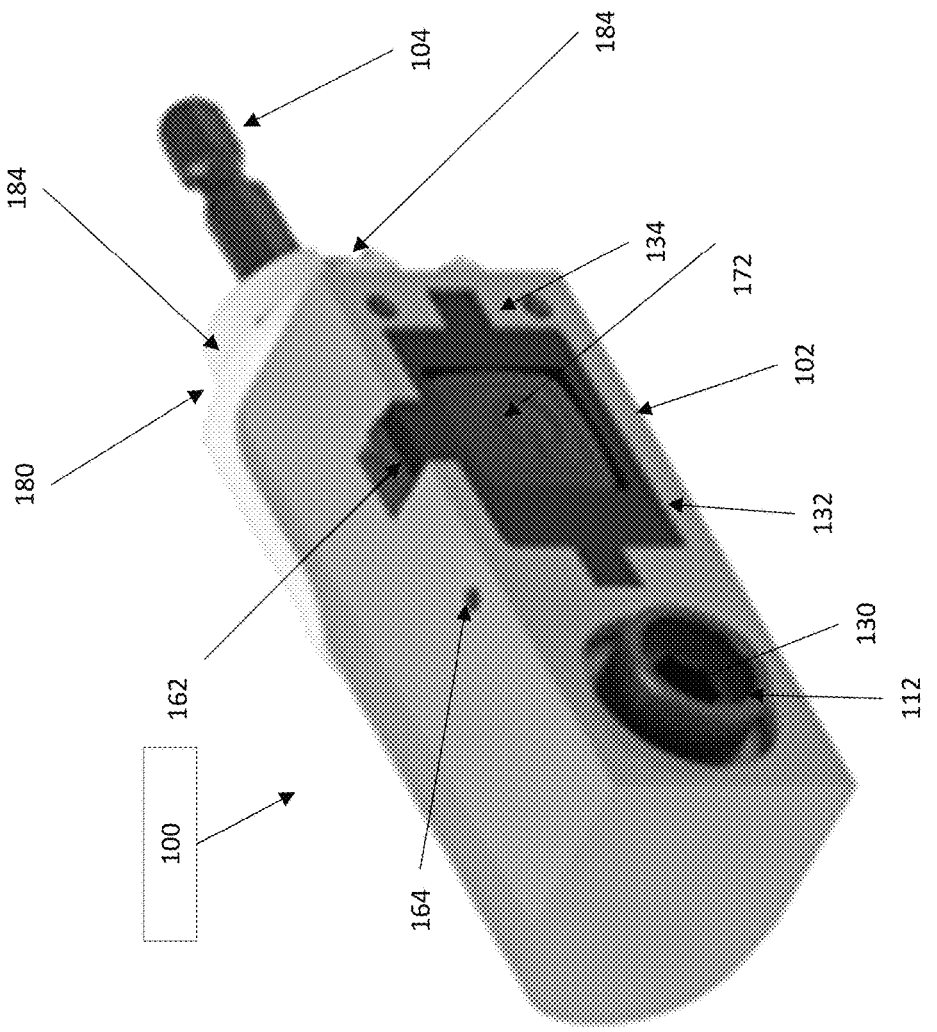
FIG. 2 is a perspective view of the angled tool accessory holder of FIG. 1.

Referring to FIGS. 1-7, an example implementation of an angled tool accessory holder 100 includes a housing 102 that at least partially receives an input shaft 104 rotatably drivable about a first axis X1. A transmission 106 is received in the housing 102 and includes a first angle gear 108 (e.g., an input bevel gear) rotatably drivable by the input shaft about the first axis X1, and a second angle gear 110 (e.g., an output bevel gear) rotatably drivable by the first angle gear about a second axis X2 at an angle α (e.g., an approximately right angle) to the first axis X1. A first tool accessory holder 112 (e.g., a first tool bit holder) is coupled to and rotatably drivable by the second gear 110 about the second axis X2. In some embodiments, the first tool accessory holder 112 may be integral with the second gear 110. The angled tool accessory holder 100 or some of its components may have a structure and/or function substantially similar to one or more embodiments of a right angle attachment disclosed in U.S. Pat. No. 9,314,852 and an angled tool accessory holder disclosed in U.S. Pat. No. 11,534,897, each of which is incorporated herein by reference in their entirety.

In an implementation, the housing 102 is generally L-shaped with a rear end or input portion 114 and a front end or output portion 116. The input portion of the housing includes a grip portion 118. The first input shaft 104 comprises a polygonal (e.g., hexagonal) shaft 120 that extends out of the rear end or input portion 114 of the housing and that has an annular ball groove 122. The input shaft 102 is supported in the housing 100 by a first bearing 124 (e.g., a sleeve bearing) and is fixedly coupled to the first angle gear 108 (e.g., by a press fit connection). The first angle gear 108 may be a right angle bevel gear and may be supported in the input portion of the housing by a second bearing 126. The second angle gear 110 may be a right angle bevel gear and may be supported in the output portion of the housing by a third bearing 128. The first tool bit holder 112 may be fixedly coupled to (e.g., integrally formed with) or separately coupled to the second angle gear 110 and may protrude at least partially from the output portion 106 of the housing 102.

Figure 8:
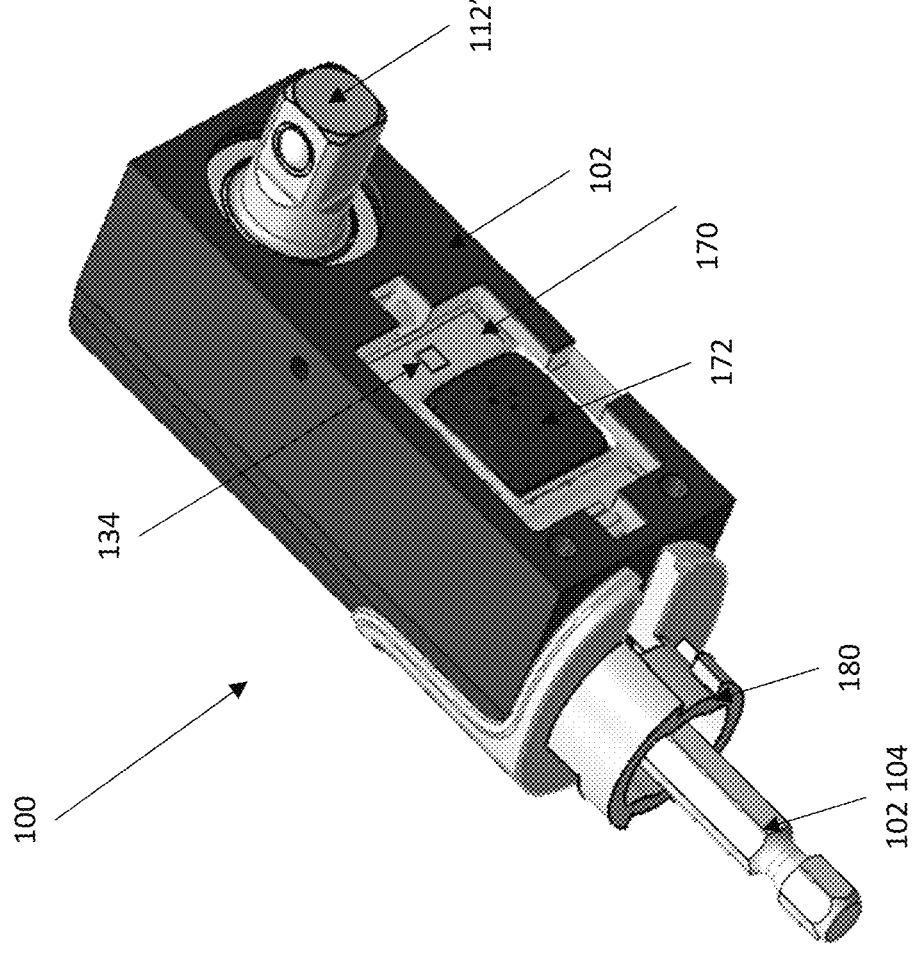
FIG. 8 is a perspective view of another example implementation of an angled tool accessory holder.

The first tool bit holder 112 may have a polygonal (e.g., hexagonal) recess 130 for receiving a tool bit (e.g., a screwdriving bit, a fastening bit, or a drill bit) having a polygonal shaft. The first tool bit holder 112 may have a configuration similar to the first tool bit holder disclosed in the aforementioned U.S. Pat. No. 11,534,897. Alternative embodiments for the first tool bit holder may be found, for example, in U.S. Pat. Nos. 10,150,205; 7,086,813; 6,929, 266; 6,261,035; and 5,988,957, which are incorporated herein by reference in their entirety. As shown in FIG. 8, in another example implementation, an angled tool accessory holder may have a first tool accessory holder in the form of a polygonal socket holder 112' (e.g., a square head driver) configured to engage and drive a plurality of sockets for driving nuts and polygonal heads of fasteners.

Figure 3:
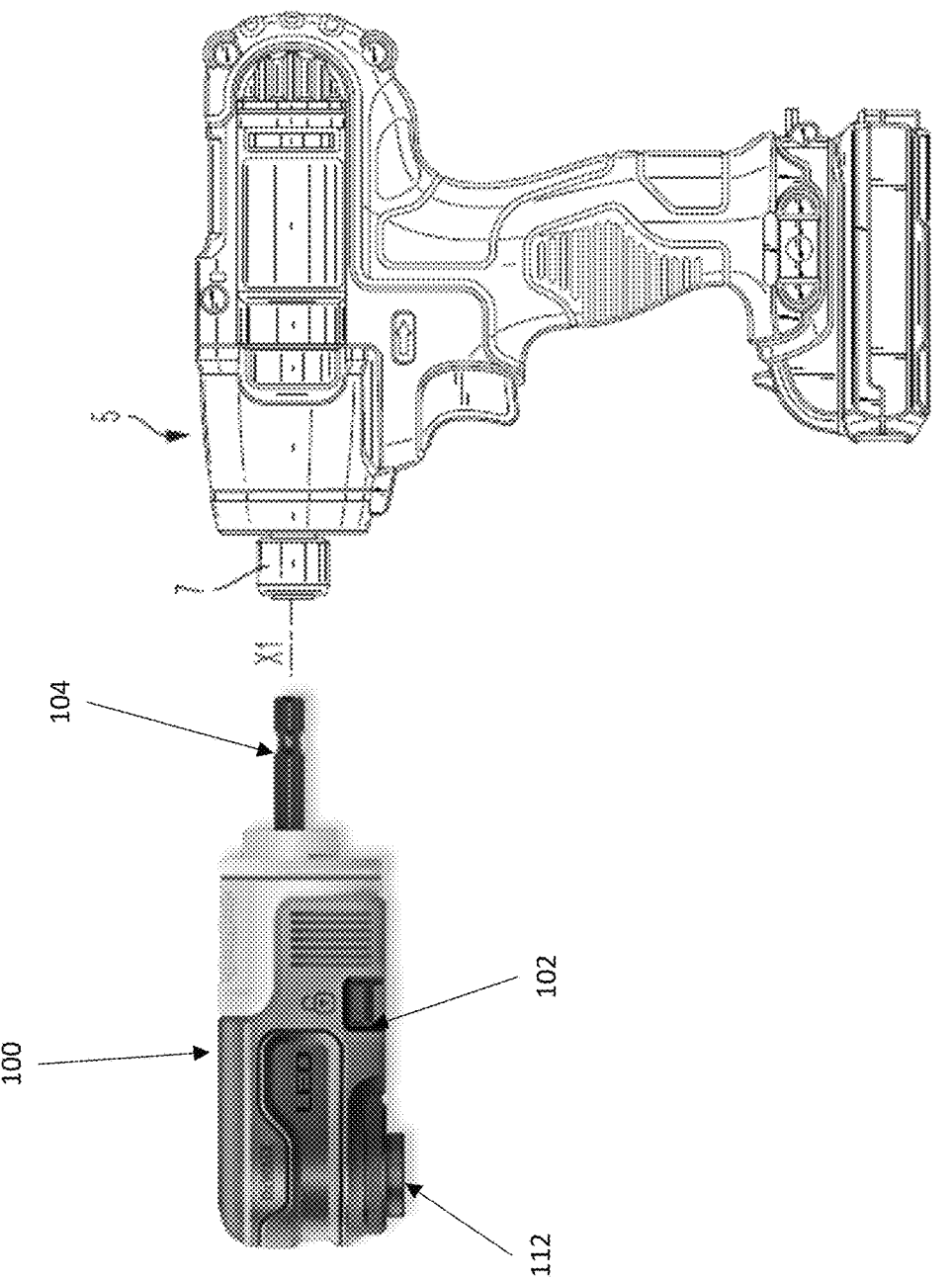
FIG. 3 is a side view of the angled tool accessory holder of FIG. 1 coupleable to an example implementation of a power tool.
Figure 4:
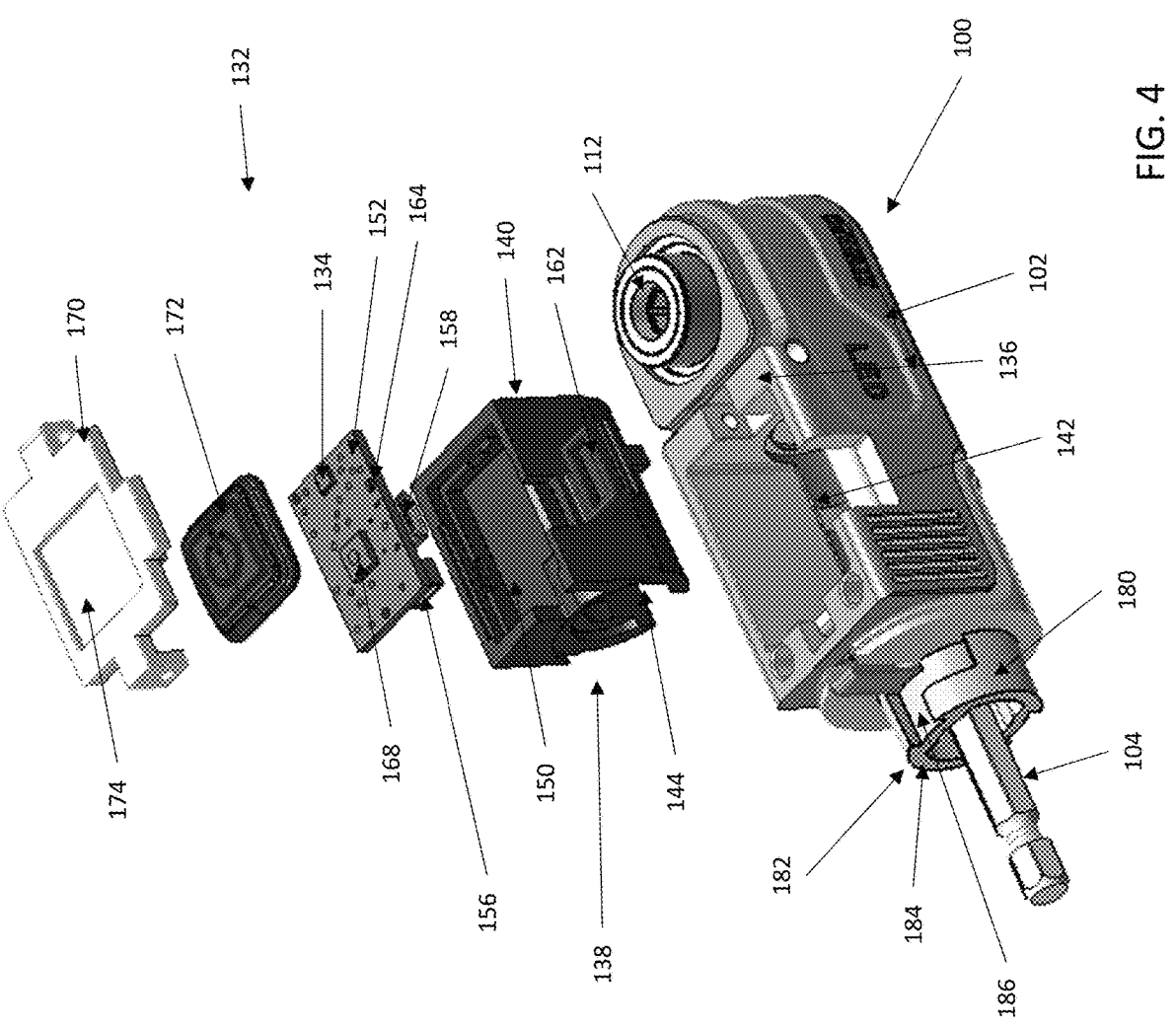
FIG. 4 is an exploded view of the angled tool accessory holder of FIG. 1.
Figure 6:
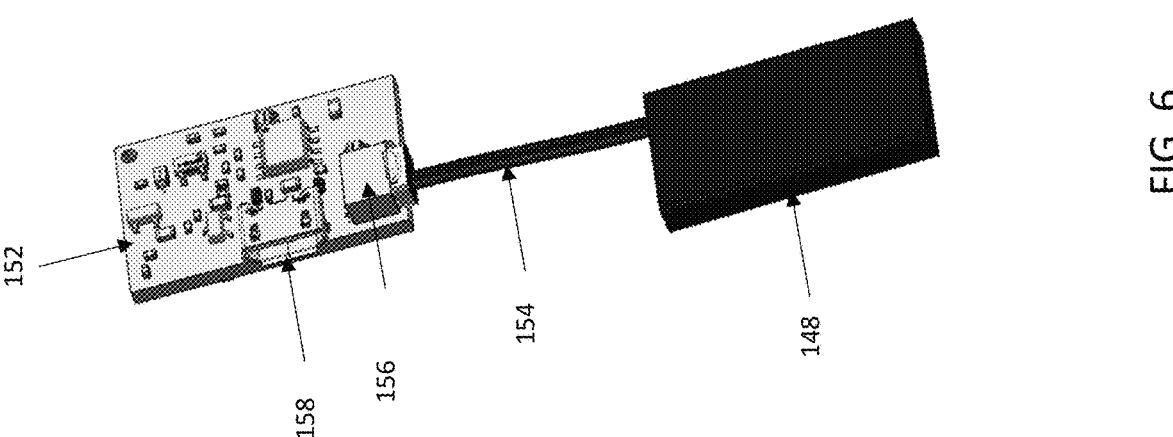
FIG. 6 is a perspective view of an example implementation of a battery and a circuit board for the angled tool accessory holder of FIG. 1.
Figure 5:
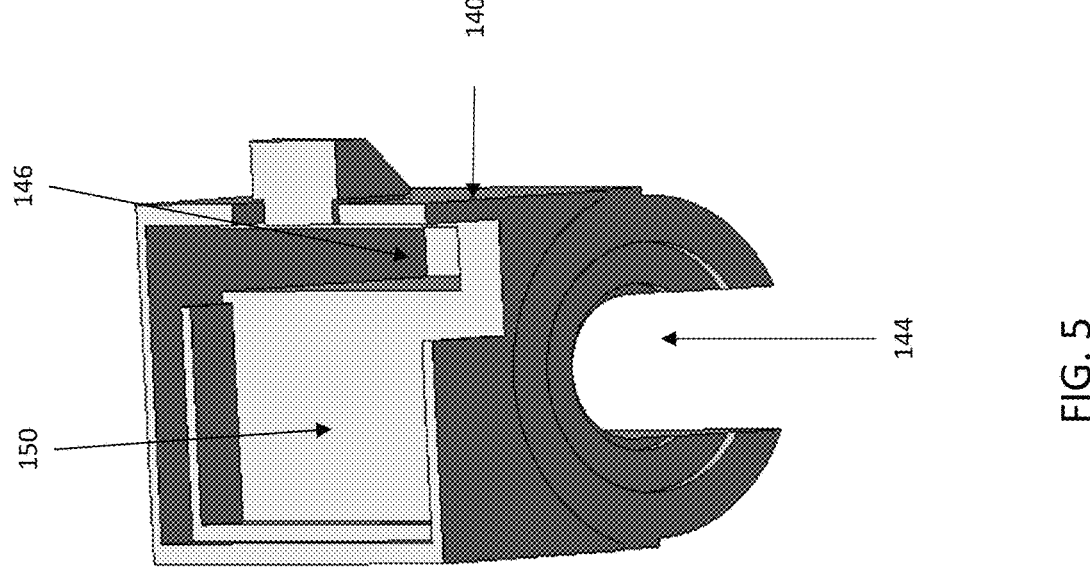
FIG. 5 is a perspective view of an example implementation of an insert for the angled tool accessory holder of FIG. 1.
Figure 7:
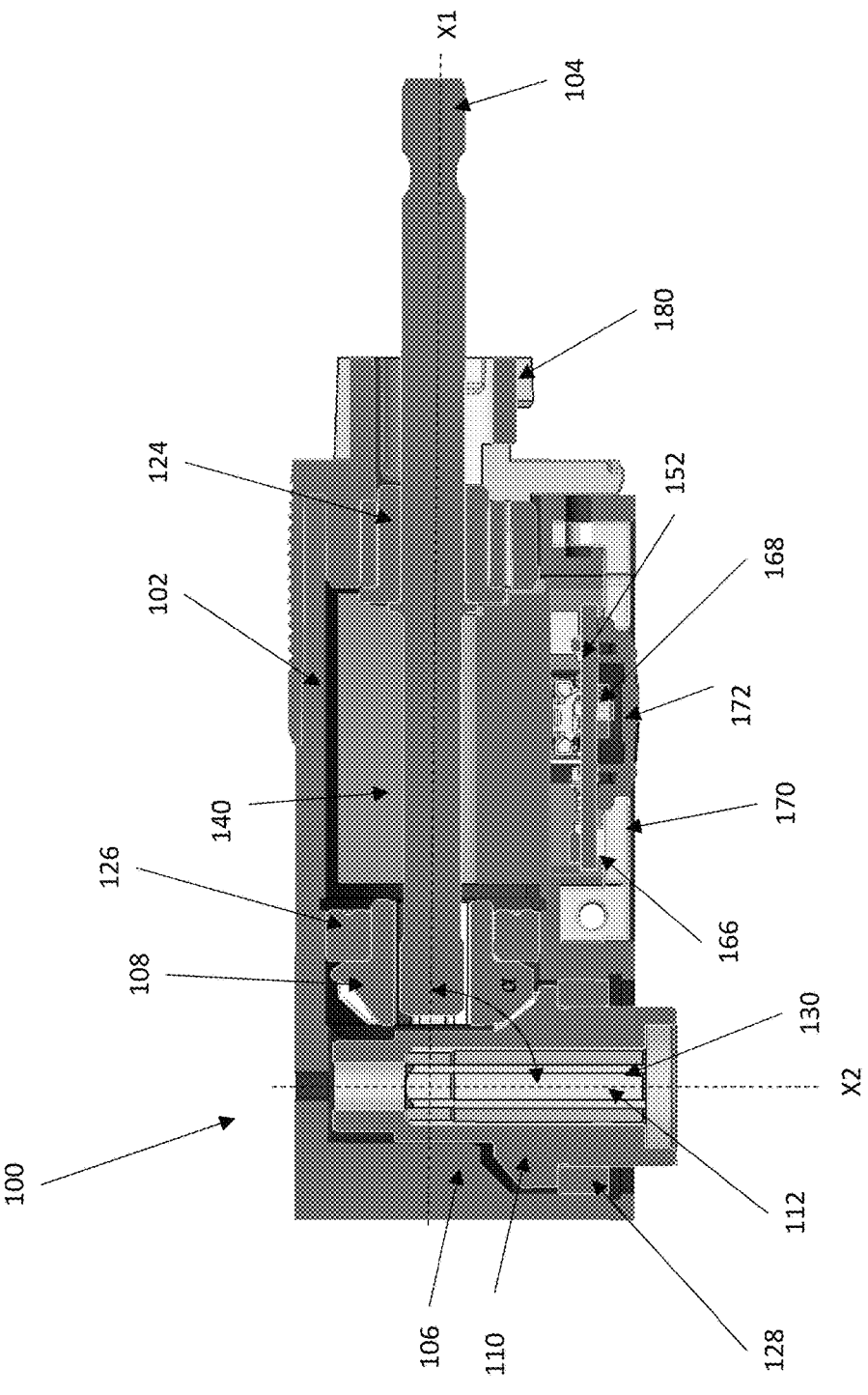
FIG. 7 is a cross-sectional view of the angled tool accessory holder of FIG. 1.

As shown in FIG. 3, the angled tool accessory holder 100 may be usable to drive a tool bit received by the first tool bit holder 112. The input shaft 104 is configured to be received in a rotatable output member 7 (e.g., a chuck or quick release bit holder) of a rotary power tool 5 (e.g., a drill, an impact driver, or a screwdriver). Rotational torque from the power tool may be transmitted to the tool bit via the first input shaft 104, the transmission 106 (e.g., the first angle gear 108 and the second angle gear 110), and the first tool bit holder 112.

The angled tool accessory 100 further includes a light assembly 132 with a light 134 on an underside 136 near the front end portion 116 of the housing configured to illuminate a work area of a workpiece adjacent the tool bit holder 112. The light assembly 132 includes a vibration damping member 138 configured to dampen vibrations between the light assembly 132 and the housing 102 and between the light assembly 132 and the input shaft 104. In the illustrated implementation, the vibration damping member 138 comprises an insert 140 received in a cavity 142 in the underside 136 of the housing 102. The insert 140 may composed of an elastomeric material such as rubber, plastic, or another elastomeric or vibration damping material. The insert 140 may include a U-shaped opening 144 that at least partially surrounds the input shaft 104 when the insert 140 is received in the cavity 142. In other embodiments, the insert 140 may sit above the input shaft so that it does not have an opening or may have a different shaped opening such as a round or O-shaped opening or a polygonal opening. The vibration damping member 138 also may act as a seal to inhibit dust and debris from entering the electronic components of the light assembly 132 from an external environment.

The insert 140 also may have a pocket 146 that receives a battery 148, and a recess 150 (which may be transverse to the pocket 146) that receives a printed circuit board (PCB) 152, which is electrically connected to the battery 148. The battery 148 may be electrically coupled to the PCB 152 by one or more wires 154 that connect to an electrical connector 156 on the PCB 152. The battery 148 may comprise one or more of a cylindrical cell, a pouch cell, a prismatic cell, a coin cell, or some other geometry and may be single use or rechargeable.

Figures 20A, 20B:
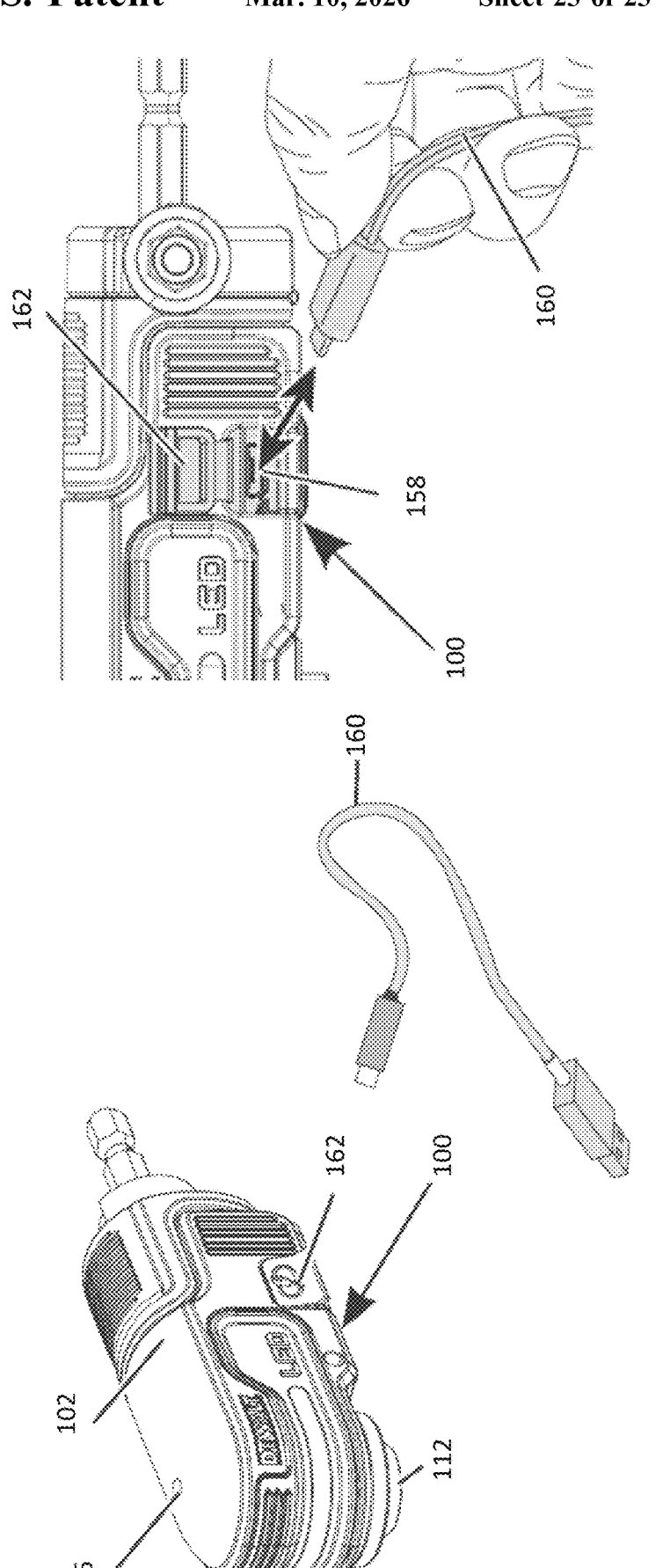
FIG. 20A is a perspective view of an example implementation of modular tool accessory holder system that includes an angled tool accessory holder and a charging cable.
FIG. 20B is a close-up side view of the modular tool accessory holder system of FIG. 20A.

Referring also to FIGS. 20A and 20B, mounted to the PCB 152 may be a charging port 158 (e.g., a USB, a mini-USB, a micro-USB, or a USB-C port) for charging the battery 148 with a charging cable 160. The charging port 158 may be covered by a port cover 162, e.g., a rubber, plastic, or elastomeric cover pivotably coupled to the housing via a hinge or living hinge. The port cover 162 can be pivoted or moved to access the charging port 158 to charge the battery 148. The PCB 152 may also include a controller and/or control circuitry (not shown) for controlling charging and discharging of the battery. Next to the charging port 158 may be a status indicator 164 (e.g., an indicator LED) to indicate when the charging cord 160 is plugged in and/or when the battery 148 is charging. The status indicator 164 may change color or flash to indicate when the battery is charging and when the battery is fully charged.

Also coupled to the PCB 152 is the light 134 (e.g., a LED or a plurality of LEDs) for illuminating the workpiece, and a switch 168 (e.g., a pushbutton switch, a momentary switch, or a toggle switch) for turning on and off the light. The LED 134 can be mounted directly to the PCB 152 or can be on a separate PCB 152 that is connected by wires to the main PCB. A light assembly cover 170 is received over a portion of the housing 102, the cavity 142, the vibration damping member 138, the PCB 152, the battery 148, the light 134, and the switch 168, and may be substantially flush with the underside of the housing 102. The cover 170 may be transparent or translucent, or may have an opening, to allow light from the LED 134 to illuminate the workpiece. The cover 170 also may include or receive an opening, a clear cover, or a lens configured to transmit, redirect, focus, or diffuse light emanating from the LED 134. The cover 170 may be removable or otherwise configured to allow replacement of the battery.

A button 172 (e.g., a pushbutton) may be received in a central opening 174 in the cover 170. The button 172 may include an elastomeric portion and may be depressed or other actuated to actuate the switch 168. In use, to turn on the light 134, the operator presses and releases the button 172, which actuates the switch 168. This turns on the light 134 and starts a timer. The light 134 remains on until the switch 168 is actuated a second time, or until the timer expires.

Referring also to FIGS. 9-11C, the angled tool accessory 100 described above may be used as part of a modular tool accessory holder system 600, which may also include one or more of a flexible orientation bit holder 700, an extension handle 800, and a side handle assembly 900. The angled tool accessory 100 may include a first engagement member or connector 180 non-rotatably coupled to the rear end portion 114 of the housing 102. The connector 180 includes a cylindrical extension 182 with a first bayonet-style connector 184 having at least one L-shaped slot 186. Further details about the structure and operation of the flexible orientation bit holder, the extension handle, and the side handle assembly can be found in U.S. Pat. No. 11,534,897, which is incorporated by reference in its entirety.

Figure 9:
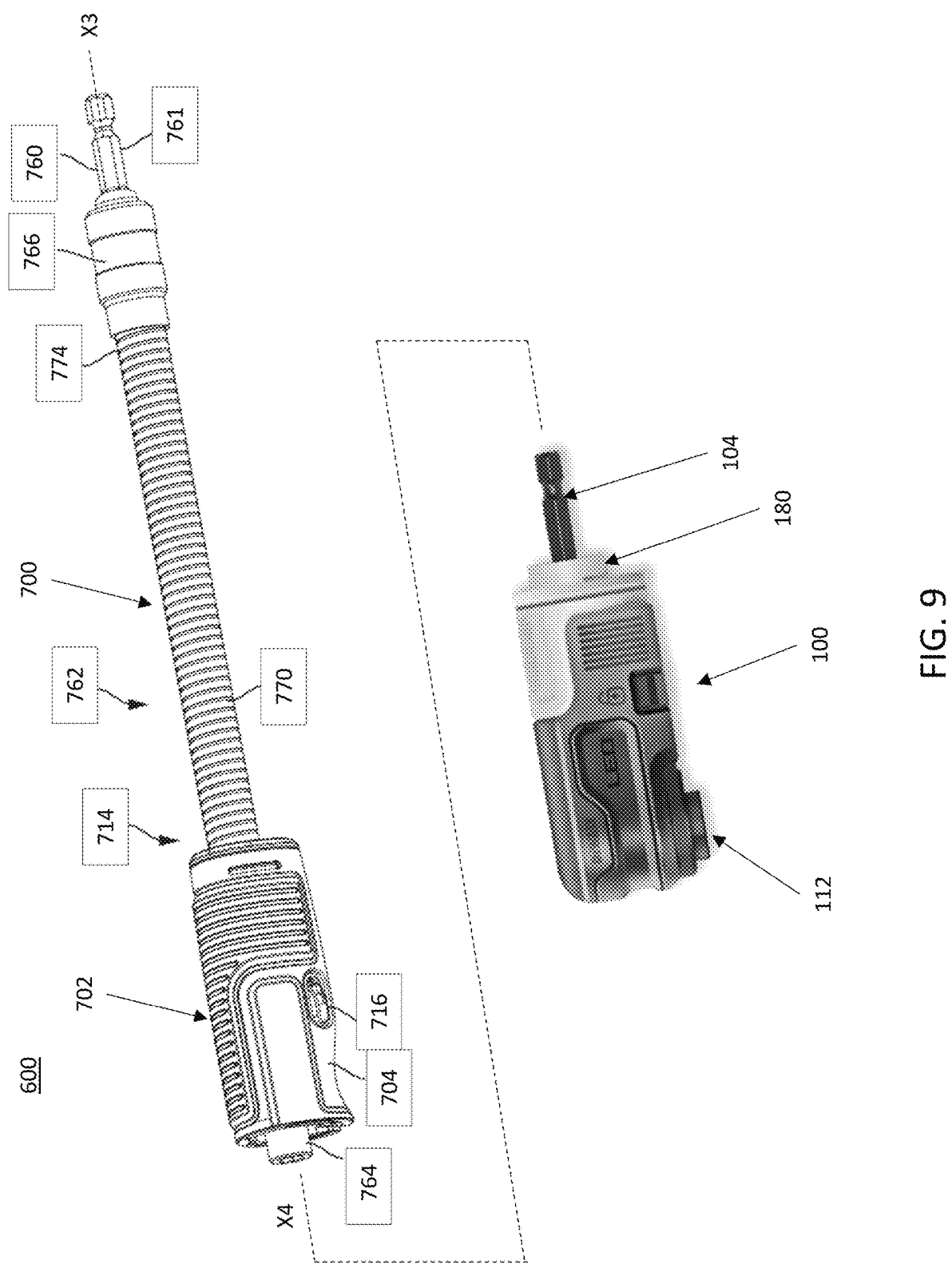
FIG. 9 is a perspective view of an example implementation of modular tool accessory holder system that includes an angled tool accessory holder and a flexible shaft tool accessory holder.

Referring to FIG. 9, the flexible orientation bit holder 700 includes a second input shaft 760 rotatably drivable about a third axis X3, a flexible intermediate shaft assembly 762, and a second tool bit holder 764 (e.g., a quick release bit holder) rotatably drivable by the second input shaft 760, via the flexible intermediate shaft assembly 762, about a fourth axis X4. The second input shaft 760 has a polygonal (e.g., hexagonal) shank 761 and an annular ball groove so that the input shaft 760 is configured to be received in a bit holder (e.g., a quick release bit holder) of a rotary power tool such as a drill, an impact driver, or a screwdriver. The flexible intermediate shaft assembly 762 includes a generally cylindrical, rigid rear bushing 766, a generally cylindrical rigid front bushing, a flexible sheath 770 fixedly connected to and between the rear bushing 766 and the front bushing, and an inner flexible shaft (not shown) received through the flexible sheath 770, supported at its rear end 774 by the rear bushing 766 and at its front end by the front bushing. The flexible intermediate shaft is rotatably drivable by the second input shaft 760 and transmits rotational torque to the second tool bit holder 764. The inner flexible shaft and the flexible sheath 770 each are bendable into a plurality of curved and straight configurations, and may be semi-rigidly retained in such configurations, e.g., they may have a gooseneck structure.

The flexible orientation bit holder 700 also includes a second engagement member or connector 702 including a generally cylindrical sleeve 104 non-rotatably received over the second tool bit holder 764. The sleeve 704 is axially moveable relative to the second bit holder 764 along the fourth axis X4 between a rearward position in which the sleeve 704 exposes all or most of the second bit holder 764 and is not engageable with the housing 102 of the angled tool accessory holder 100, and a forward position in which the sleeve 704 covers some or all of the second bit holder 764 and is non-rotatably engageable with the first connector 180 of the angled tool accessory holder 100. For example, the second engagement structure 702 may include a second bayonet-type connection coupled to a front end of the sleeve 704 and that is configured to engage with the first engagement member 180 on the housing 102 of the angled tool accessory holder 100.

Figure 10A:
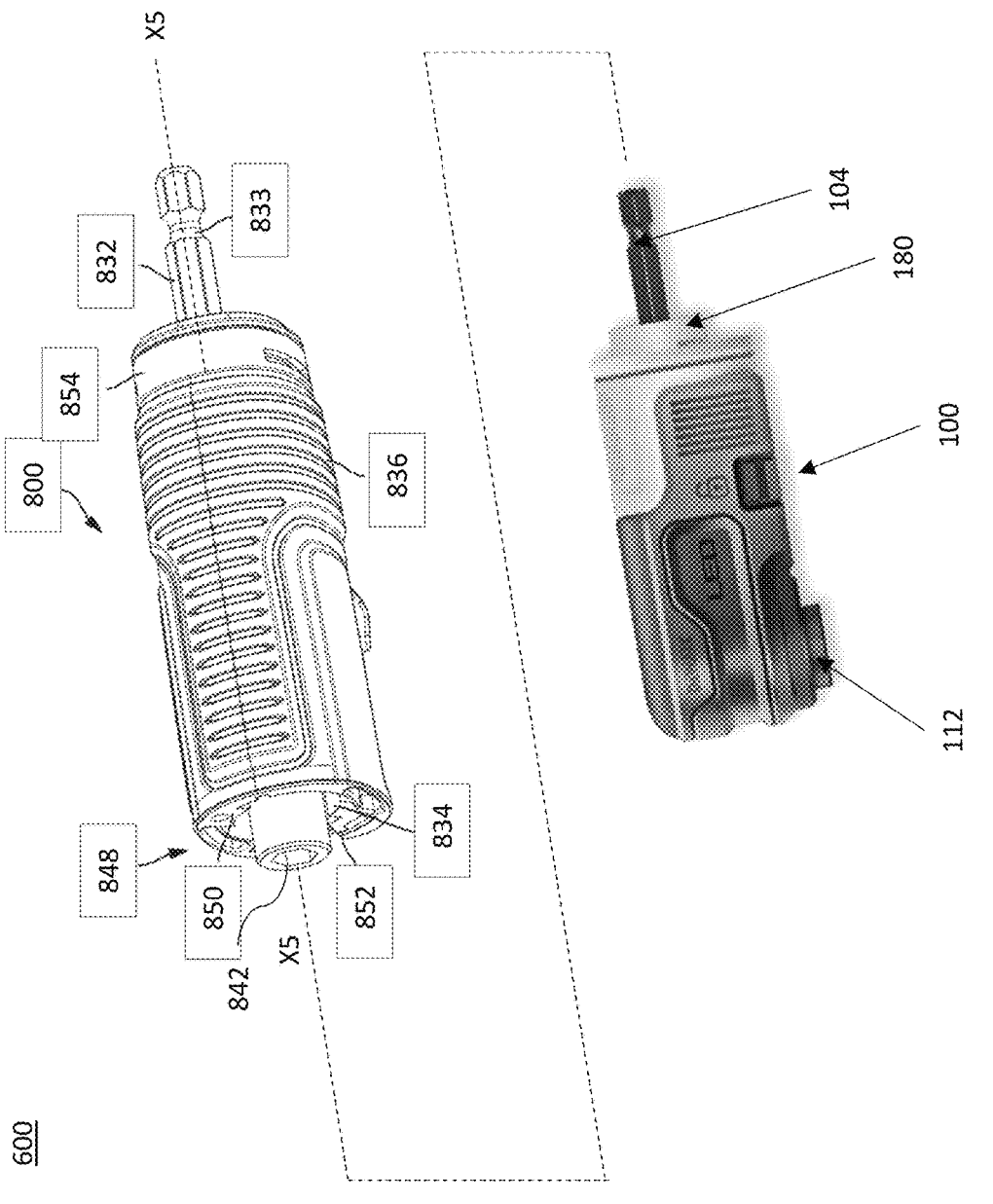
FIG. 10A is a perspective view of an example implementation of modular tool accessory holder system that includes an angled tool accessory holder and an extension handle.
Figure 10B:
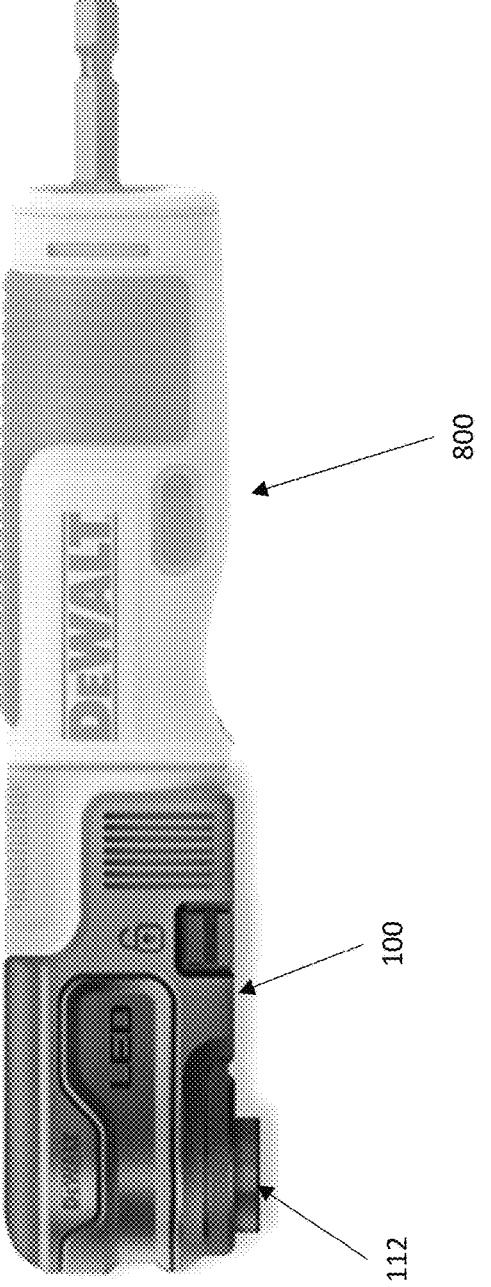
FIG. 10B is a side view of the angled tool accessory holder and the extension handle of FIG. 10A coupled to each other.

Referring to FIGS. 10A and 10B, the extension handle 800 includes a third input shaft 832 rotatably drivable about a fifth axis X5, a third output shaft 834 fixedly coupled to and rotatably drivable by the third input shaft 832 about the fifth axis X5, and a generally cylindrical handgrip 836 received at least partially over the third input shaft 832 and the third output shaft 834. The third input shaft 832 may comprise a polygonal (e.g., hexagonal) shaft with a ball groove 833 supported for rotation in the handgrip 836. The third input shaft 832 may extend rearward from the handgrip 836 along the fifth axis X5 for coupling to an output of a rotary power tool. The third output shaft 834 may include a front bore 842, which may have a polygonal (e.g., hexagonal) recess configured to receive the first input shaft 104 of the angled tool accessory holder 100.

The handgrip 836 has a third engagement structure or connector 848 at its front end configured to engage the first engagement structure or connector 180 on the housing 102 of the angled tool accessory holder 100 to non-rotatably and axially couple the extension handle 800 to the angled tool accessory holder 100. The third engagement structure 848 may include a bayonet-type connection in the form of at least one (e.g., two diametrically opposed) radial inward projections 850 configured to engage the L-shaped slots on the first engagement structure 180.

Figure 11A:
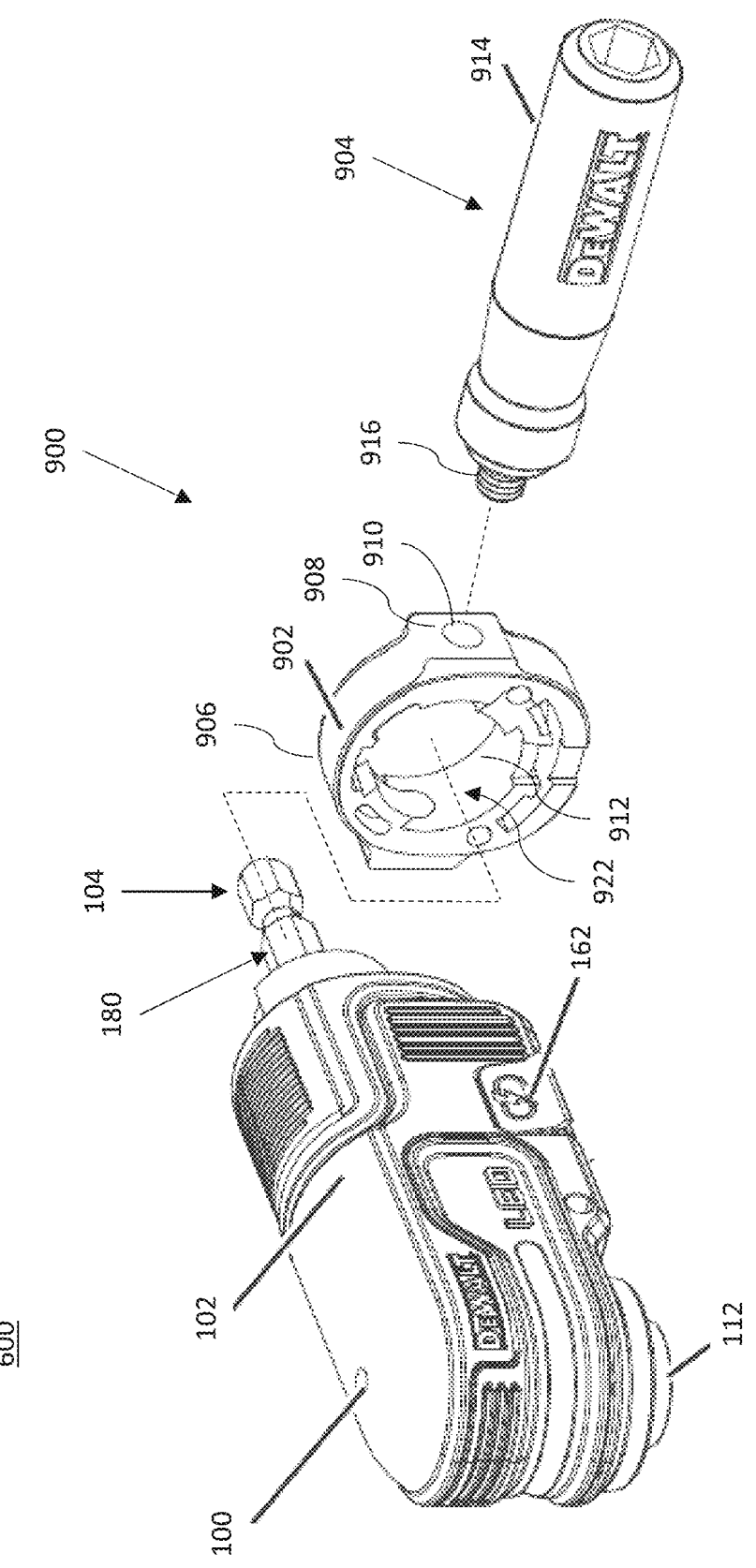
FIG. 11A is a perspective view of an example implementation of modular tool accessory holder system that includes an angled tool accessory holder and a side handle.
Figure 11C:
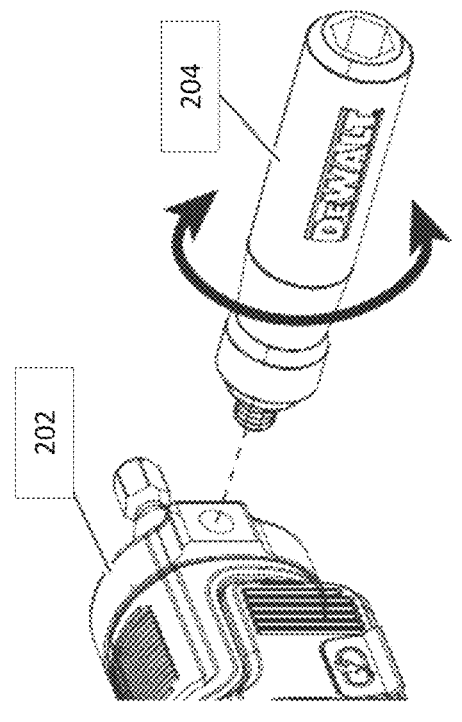
FIGS. 11B and 11C are perspective views of the modular tool accessory holder system of FIG. 10B, showing coupling of the side handle to the angled tool accessory holder.
Figure 11B:
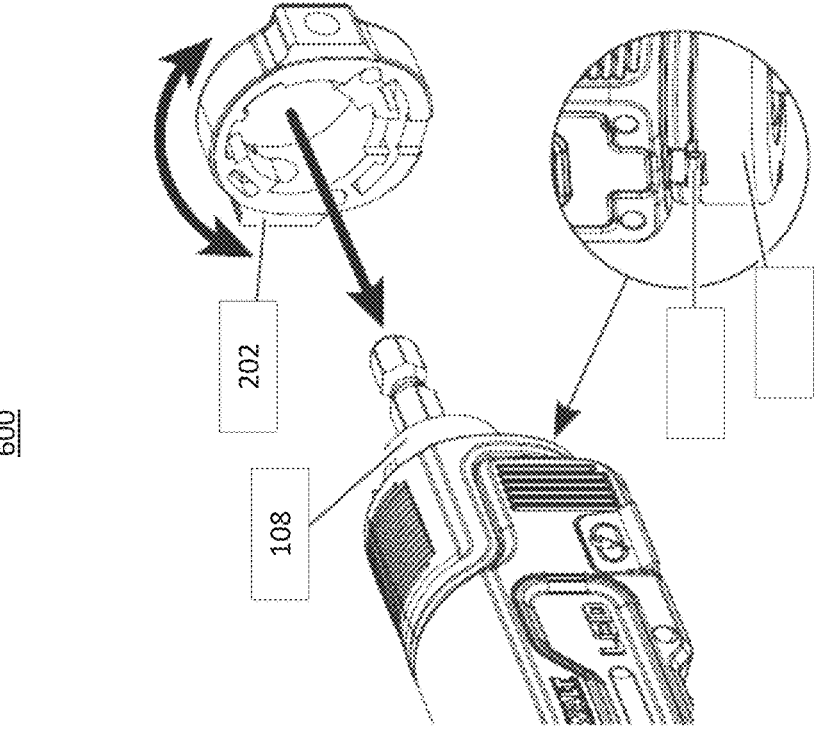

Referring to FIGS. 11A-11C, the side handle assembly 900 may include a collar 902 and a side handle 904 configured to be removably coupled to the first engagement structure or connector 180 on the angled tool accessory holder 100. The collar 902 includes an annular body 906 with a pair of diametrically opposed lateral ears 908, each including a threaded bore 910. An interior wall 912 of the collar 902 includes a fourth engagement structure 922 to non-rotatably and axially engage the first engagement structure 180 on the angled tool accessory holder 100. For example, the fourth engagement structure 922 may include a bayonet-type connection comprising at least one (e.g., two) radial inward projections configured to engage the L-shaped slots on the first engagement structure 180 on the angled tool accessory holder 100. To couple the collar 902 to the angled tool accessory holder 100, the collar 902 is moved axially forward over the input shaft 104 until the radial inward projections engage and enter the L-shaped slots. When the collar 902 reaches its forwardmost position, the collar 902 is twisted so that the projections engage the bases of the L-shaped slots. The side handle 904 includes a handgrip 914 and a threaded bolt 916. The side handle 904 can be removably coupled to either lateral side of the collar 902 by threading the threaded bolt 916 into one of the threaded bores 910 in the ears 908 on lateral sides of the collar 902. The side handle 904 provides a more secure hand grip for inhibiting rotation of the housing 102 of the angled tool accessory holder 100.

The system 600 is operable in a first configuration in which the angled tool accessory holder 100 is operable without the flexible orientation tool bit holder 700 and without the extension handle 800 to drive a first tool accessory coupled to the first tool accessory holder 112 by coupling the first input shaft 104 to a rotatable output member of a power tool. In the first orientation, the collar 902 and side handle 904 of the side handle assembly 900 may be coupled to the angled tool accessory holder 100 to allow a user to grasp the handle and stabilize the tool accessory holder 100.

The system 600 is operable in a second configuration in which the flexible orientation tool bit holder 700 is operable without the angled tool bit holder 100 to drive a second tool accessory coupled to the second tool accessory holder by coupling the second input shaft 760 to a rotatable output member of a power tool.

The system 600 is operable in a third configuration using the angled tool accessory holder 100 and the flexible orientation tool bit holder 700 in combination to drive a tool bit received by the first tool bit holder 112. The first input shaft 104 is inserted into and retained in the second tool bit holder 764 and the sleeve 704 is moved axially forward and rotated to engage with the L-shaped slot in the first connector 180. The second input shaft 760 is configured to be received in a rotatable output member (e.g., a chuck or quick release bit holder) of a rotary power tool (e.g., a drill, an impact driver, or a screwdriver). The flexible shaft assembly 762 may be bent into a variety of straight, curved, and curvilinear configurations. Rotational torque from the power tool is transmitted to a tool bit via the second input shaft 760, the flexible intermediate shaft, the second tool bit holder 764, the first input shaft 704, the first angle gear 708, the second angle gear 710, and the first tool bit holder 712. Meanwhile, the first engagement member 180 and the second engagement member 702 inhibit radial and axial movement of the flexible orientation tool bit holder 700 relative to the housing 102 of the angled tool bit holder 100.

The system 600 is operable in a fourth configuration using the angled tool accessory holder 100 and the extension handle 800. The first input shaft 104 is inserted into the front bore 842 in the third output shaft 834 along the axis X5 and the handgrip 836 is moved axially forward along arrow so that the radial inward projections 850 engage and enter the L-shaped slots in the first connector 180. When the handgrip 836 reaches its forwardmost position, it is twisted so that the projections 850 engage the bases of the L-shaped slots. A tool bit may be inserted into the first bit holder 112 and the third input shaft 832 may be coupled to a power tool to drive the tool bit. In this configuration, the third input shaft 832 is configured to be received in a rotatable output member (e.g., a chuck or quick release bit holder) of a rotary power tool (e.g., a drill, an impact driver, or a screwdriver). Rotational output from the power tool is transmitted to the tool bit via the third input shaft 832, the third output shaft 834, the first input shaft 104, the first angle gear, the second angle gear, and the first tool bit holder 112.

The system 600 is operable in a fifth configuration in which the angled tool accessory holder 100 and the side handle assembly 900 are operable in combination to drive a fifth tool accessory coupled to the first tool accessory holder by non-rotatably coupling the first connector and the fourth connector and coupling the first input shaft to a rotatable output member of a power tool.

Figure 12A:
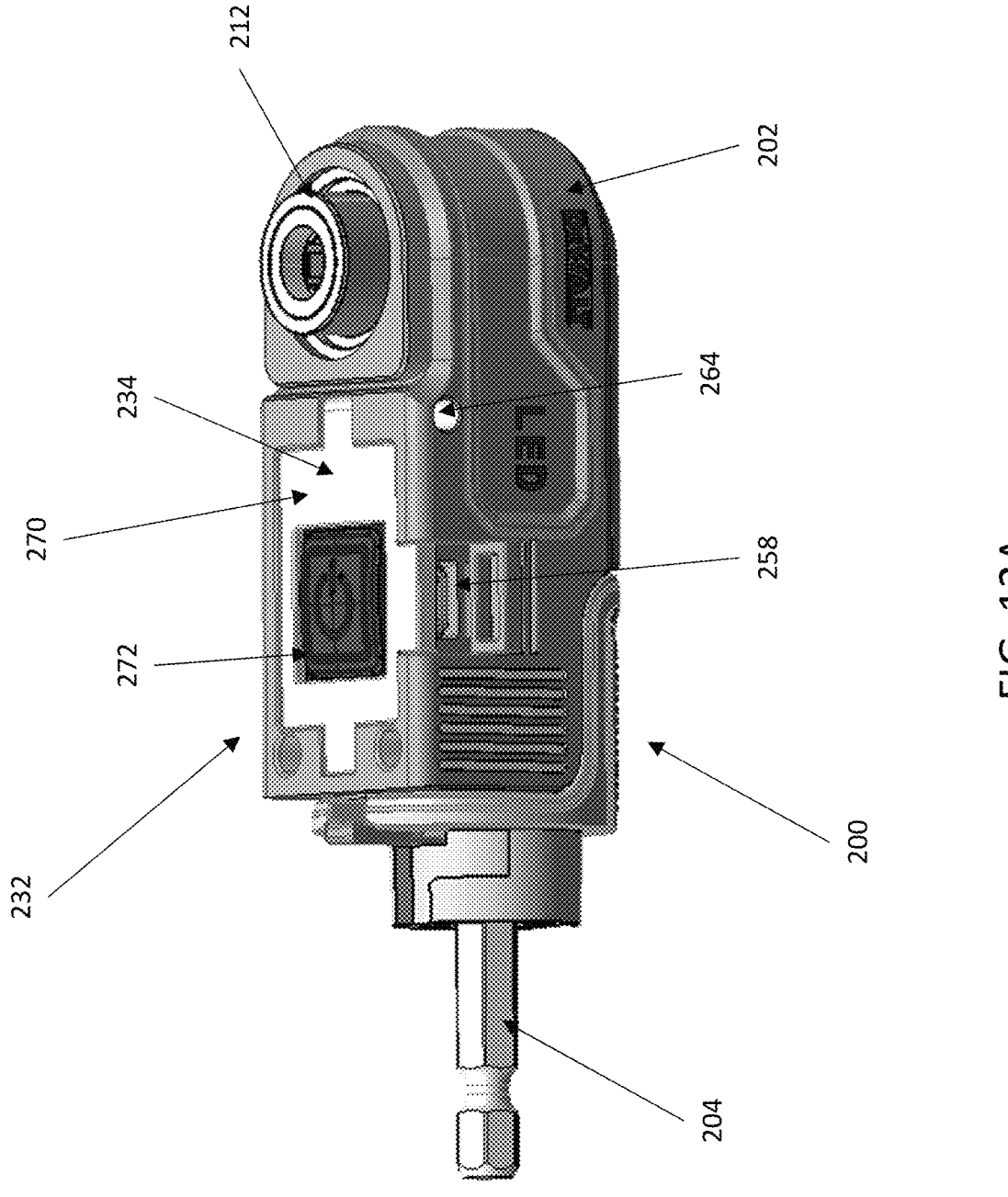
FIG. 12A is a perspective view of another example implementation of an angled tool accessory holder.
Figure 12B:
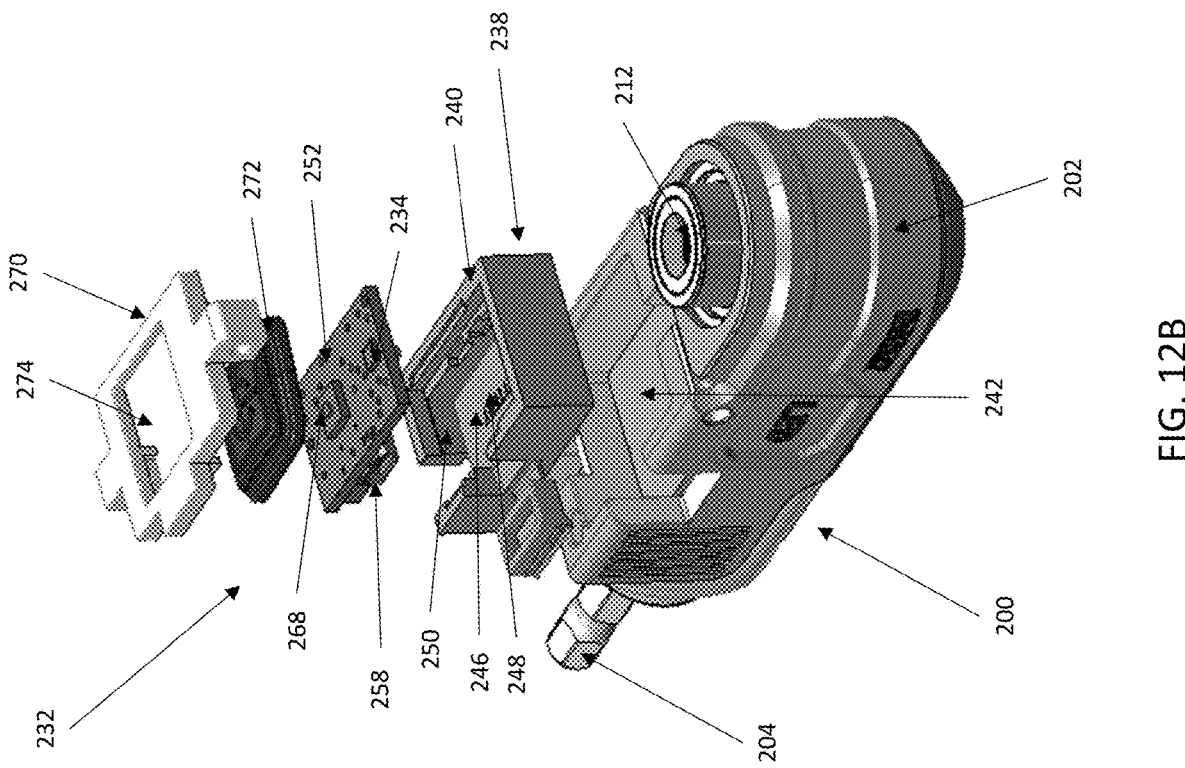
FIG. 12B is an exploded view of the angled tool accessory holder of FIG. 12A.

Referring to FIGS. 12A-12B, in another implementation, a tool bit accessory holder 200 may include a housing 202, an input shaft 204, an output tool bit holder 212, and a light assembly 232 similar to the tool bit accessory holder 100 described above with respect to FIGS. 1-7. The light assembly 232 includes a vibration damping member 238 comprising an insert 240 configured to dampen vibrations between the housing 202 and the light assembly 232 and between the light assembly 232 and the input shaft 204. The insert 240 includes a pocket 246 that receives a battery 248 and a recess 250 (which is parallel to the pocket 246) that receives a PCB 252 so that the PCB lies on top of the battery 248. Mounted to the PCB 252 are an illuminating light (e.g., LED) 234, a switch 268, and a charging port 258 for receiving a charging cable to charge the battery 248. A light assembly cover 270 is received over a portion of the housing 202, the recess 250, the vibration damping member 238, the PCB 252, the battery 248, the light 266, and the switch 234, and may be substantially flush with the underside of the housing 202. The cover 270 may be transparent or translucent, or may have an opening, to allow light from the LED 234 to illuminate the workpiece. The cover 270 also may include or receive a lens configured to transmit, redirect, focus, or diffuse light emanating from the LED 234. The cover 270 may be removable or otherwise configured to allow replacement of the battery. A button 272 (e.g., a pushbutton) may be received in a central opening 274 in the cover 270. The button 272 may include an elastomeric portion and may be depressed or other actuated to actuate the switch 268. The implementation of the angled tool accessory holder 200 in FIGS. 12A-12B differs from the angled tool accessory holder 100 in FIGS. 1-7 in the configuration of a vibration damping member that receives the PCB and the battery. The vibration damping member 238 comprises an insert made of a vibration damping material (e.g., rubber, a polymer, or plastic) that is received in a shallower cavity in the housing, and that does not have a portion that partially surrounds the input shaft. In addition, the battery 248 is received in the recess of the insert so that it is parallel and underneath the PCB 252.

Figure 13A:
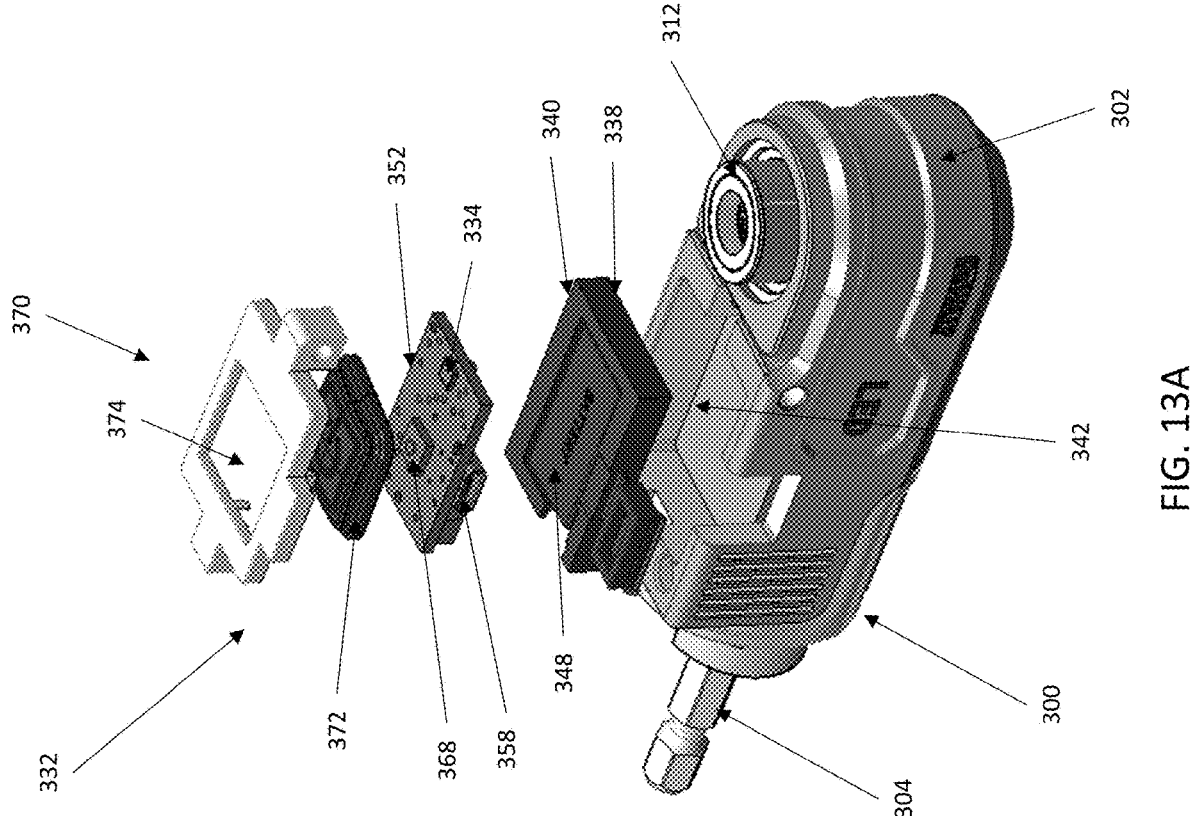
FIG. 13A is an exploded view of another example implementation of an angled tool accessory holder.
Figure 13B:
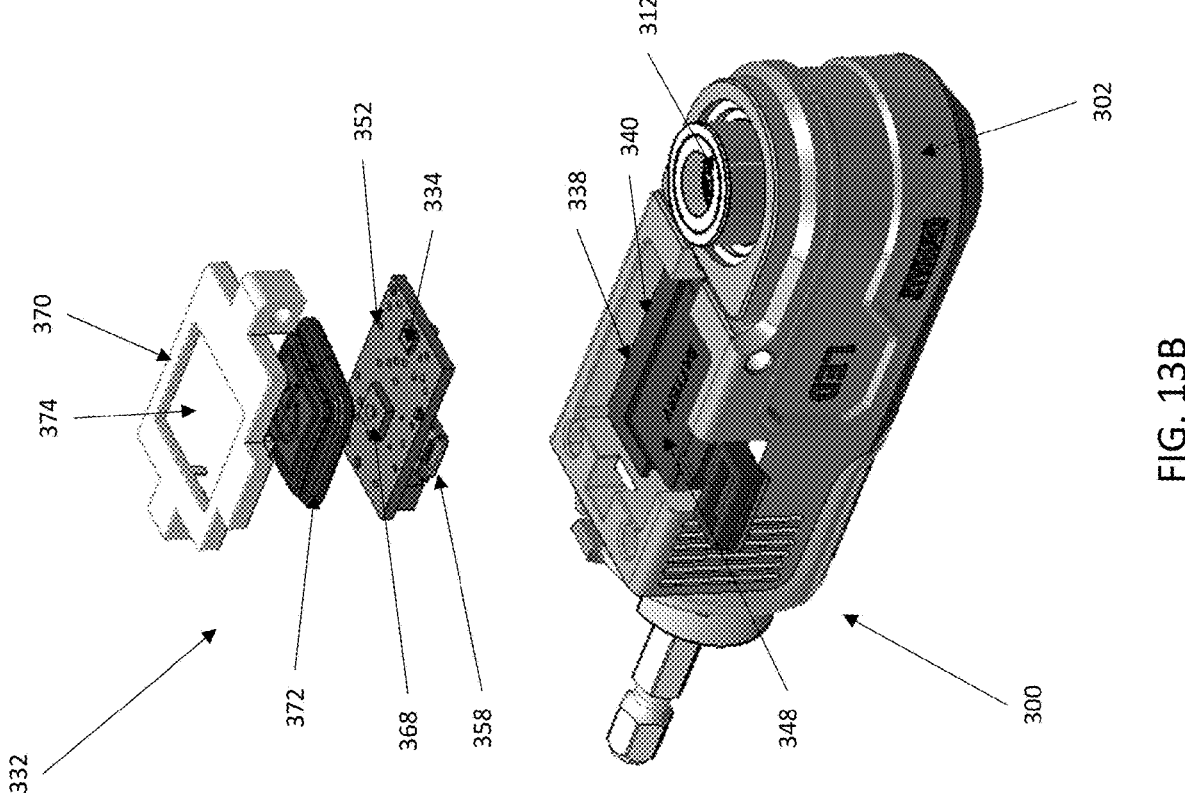
FIG. 13B is a partially assembled view of the angled tool accessory holder of FIG. 13A.

Referring to FIGS. 13A-13B, in another implementation, a tool bit accessory holder 300 may include a housing 302, an input shaft 304, an output tool bit holder 312, and a light assembly 332 that are substantially similar to to the tool bit accessory holder 100 described above with respect to FIGS. 1-7. The light assembly 332 includes a vibration damping member 338 comprising a gasket 340 that surrounds the battery 348 and upon which rests the PCB 352, the gasket 340 configured to dampen vibrations between the housing 302 and the light assembly 332 and between the light assembly 332 and the input shaft 304. Mounted to the PCB 352 are an illuminating light (e.g., LED) 334, a switch 368, and a charging port 358 for receiving a charging cable to charge the battery 348. A light assembly cover 370 is received over a portion of the housing 302, the recess 350, the vibration damping member 338, the PCB 352, the battery 348, the light 366, and the switch 334, and may be substantially flush with the underside of the housing 32. The cover 320 may be transparent or translucent, or may have an opening, to allow light from the LED 234 to illuminate the workpiece. The cover 370 also may include or receive a lens configured to transmit, redirect, focus, or diffuse light emanating from the LED 334. The cover 370 may be removable or otherwise configured to allow replacement of the battery. A button 372 (e.g., a pushbutton) may be received in a central opening 374 in the cover 370. The button 372 may include an elastomeric portion and may be depressed or other actuated to actuate the switch 368. The implementation of the angled tool accessory holder 300 of FIGS. 13A-13B differs from the angled tool accessory holder 100 of FIGS. 1-7 in the configuration of the vibration damping member 338. The vibration damping member 338 comprises a gasket 340 (composed of e.g., rubber, a polymer, plastic, or another elastomeric material) that surrounds a periphery of the battery 348 and that is received in a shallow cavity 342 in the housing 302. The PCB 352 rests on top of the gasket 340 and is retained by the cover 370, with the battery 348 parallel to the PCB 352.

Figure 14:
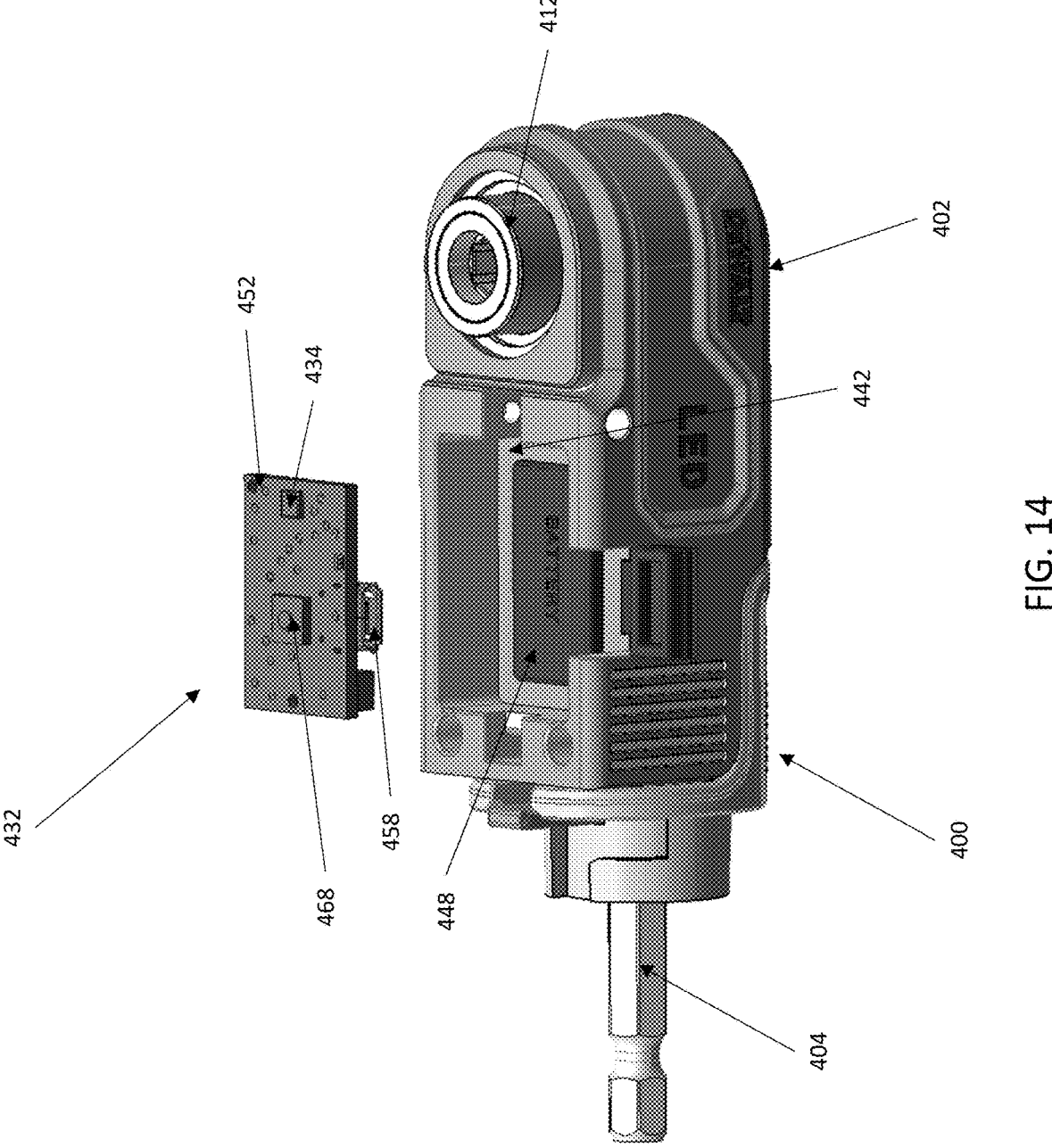
FIG. 14 is a partially exploded view of another example implementation of an angled tool accessory holder.
Figure 15:
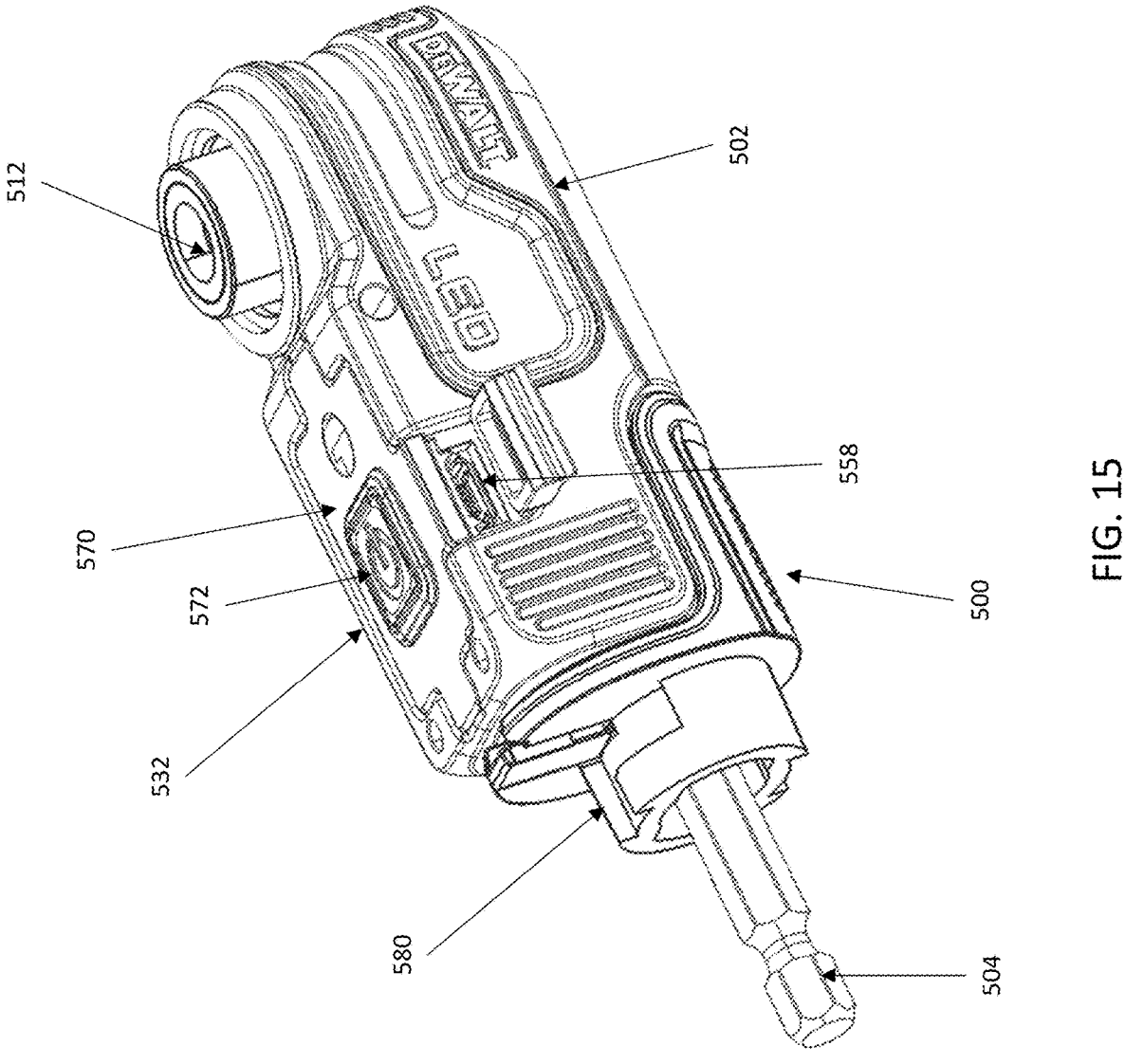
FIG. 15 is a perspective view of another example implementation of an angled tool accessory holder.
Figure 16:
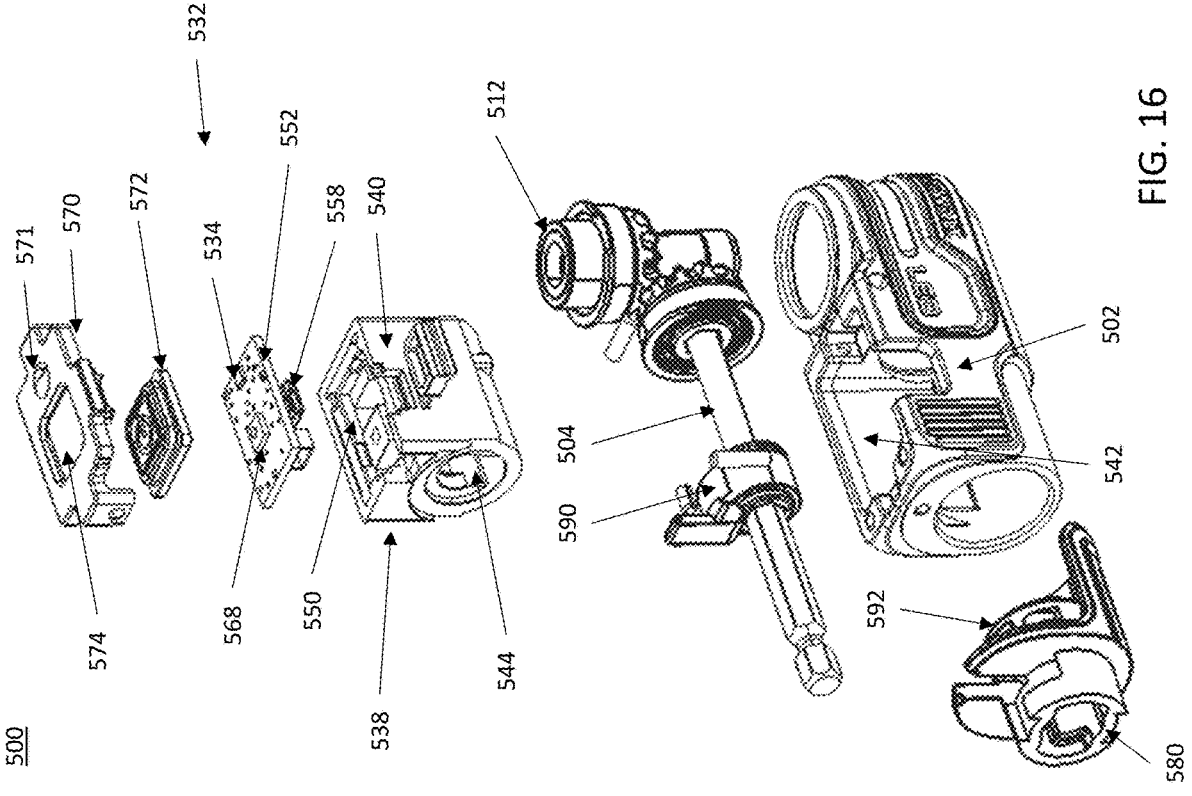
FIG. 16 is an exploded view of the angled tool accessory holder of FIG. 15.
Figure 17:
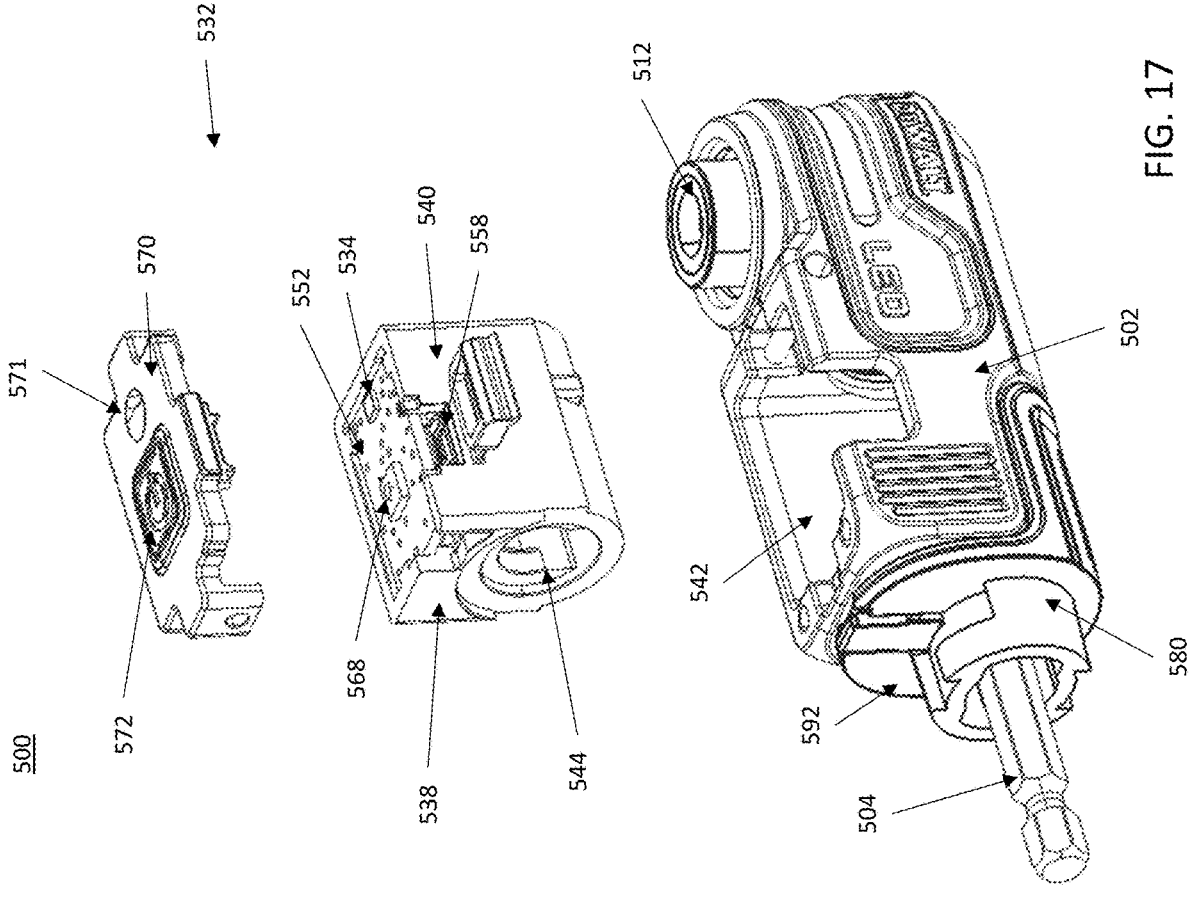
FIG. 17 is a partially assembled view of the angled tool accessory holder of FIG. 15.
Figure 18:
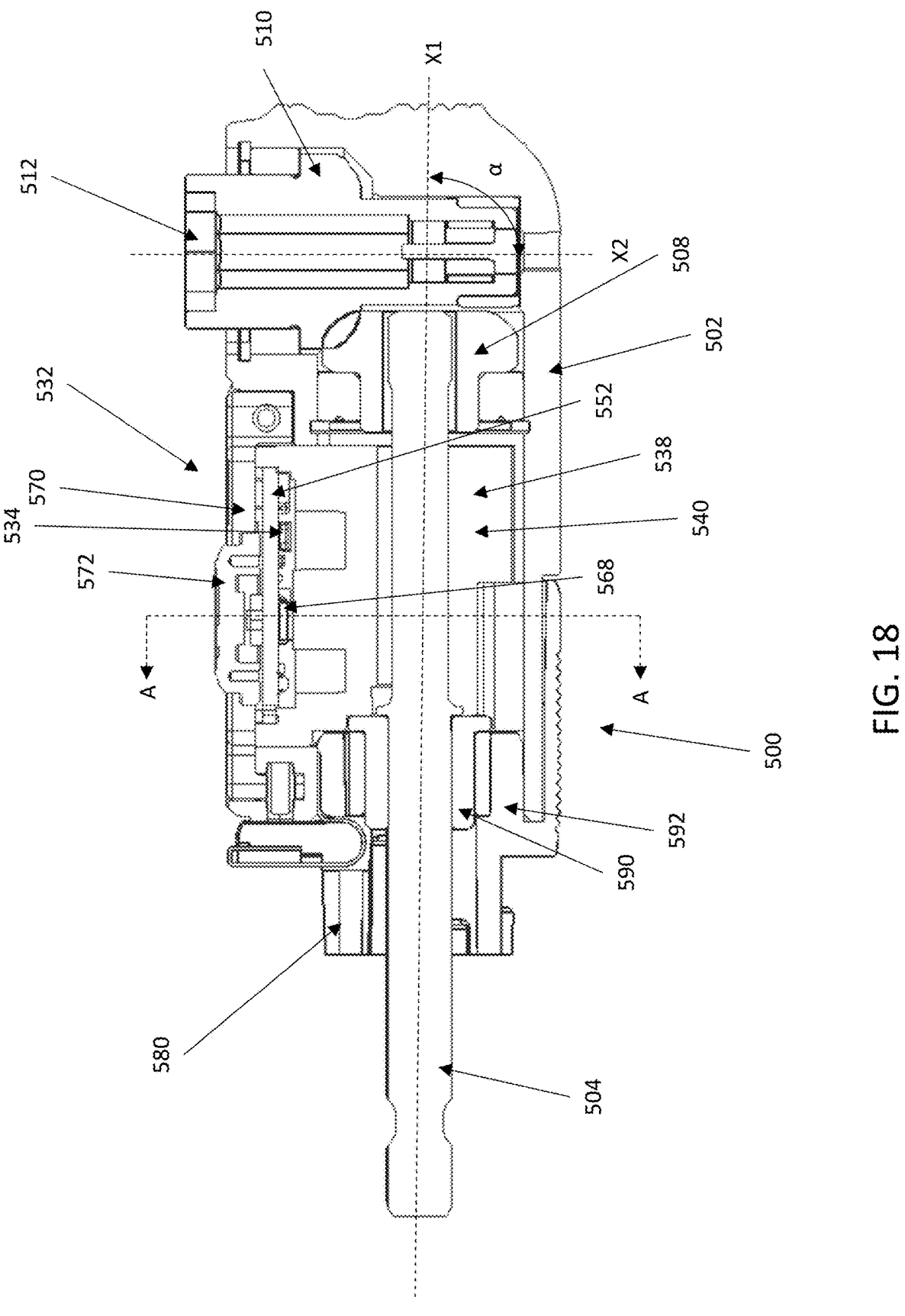
FIG. 18 is a longitudinal cross-sectional view of the angled tool accessory holder of FIG. 15.
Figure 19:
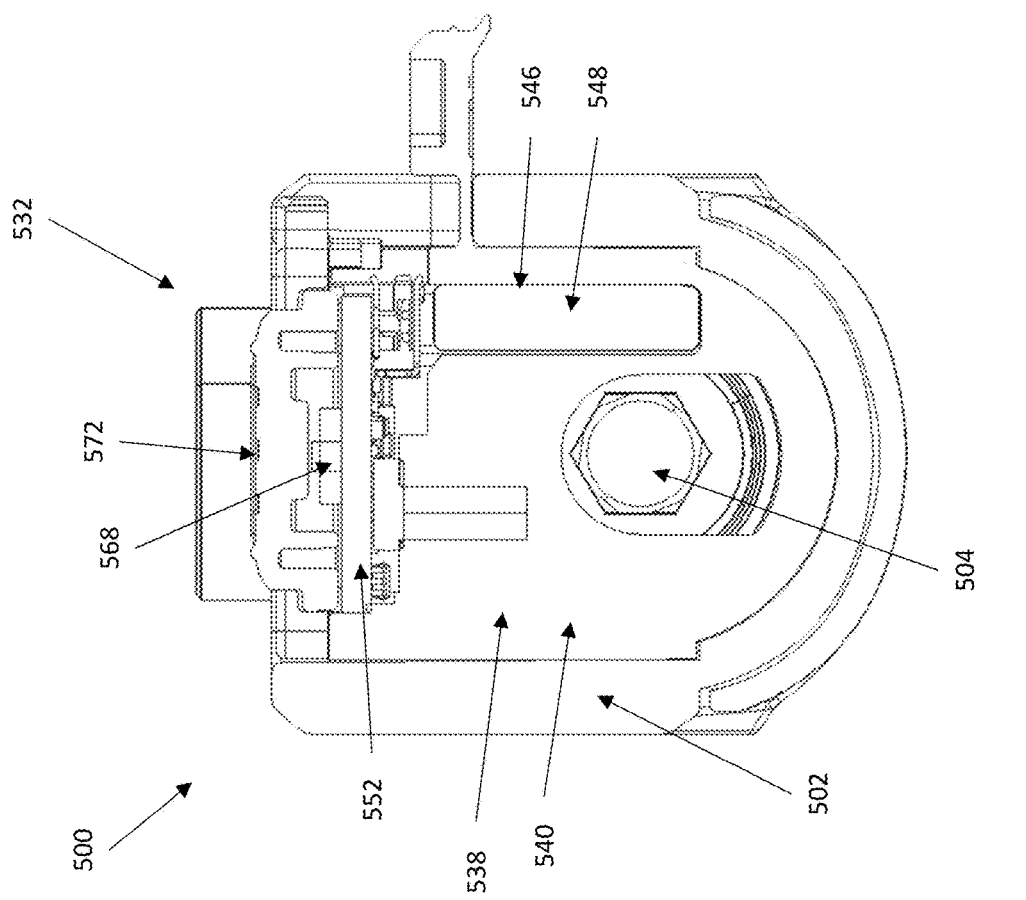
FIG. 19 is a transverse cross-sectional view of the angled tool accessory holder of FIG. 15, taken along line A-A in FIG. 18.

Referring to FIG. 14, in another implementation, a tool bit accessory holder 400 may include a housing 402, an input shaft 404, an output tool bit holder 412, and a light assembly 432 similar to the implementation of the tool bit accessory holder 100 described above with respect to FIGS. 1-7. The light assembly 432 includes a battery 448, a PCB 452 with an illuminating light (e.g., LED) 434, a switch 468, a charging port 458, a button, and a cover similar to the implementation described above with respect to FIGS. 1-7 (for ease of illustration, the button and cover are not shown). The implementation of FIG. 14 differs from the implementation of FIGS. 1-7 in the configuration of a vibration damping member. In the implementation of FIG. 14, the battery 448 and the PCB 452 are received in a cavity 442 of the housing so that they are parallel to each other and vibration damping member comprises the remainder of the cavity being filled with a vibration damping material such as potting compound (e.g., epoxy). The PCB 452 rests on top of the vibration damping potting compound and is held in place by the cover (not shown).

Referring to FIGS. 15-19, in another implementation, a tool bit accessory holder 500 may include a housing 502, an input shaft 504, an output tool bit holder 512, a light assembly 532, and a first engagement member or connector 580. A transmission 506 is received in the housing 502 and includes a first angle gear 508 (e.g., an input bevel gear) rotatably drivable by the input shaft 504 about the first axis X1, and a second angle gear 510 (e.g., an output bevel gear) rotatably drivable by the first angle gear about a second axis X2 at an angle ? (e.g., an approximately right angle) to the first axis X1. The tool accessory holder 512 (e.g., a first tool bit holder) is coupled to and rotatably drivable by the second gear 510 about the second axis X2. The tool bit accessory holder 500 similar to the tool bit accessory holder 100 described above with respect to FIGS. 1-7, with the following differences.

The light assembly 532 includes a vibration damping member 538 comprising an insert 540 received in a cavity 542 in the underside 536 of the housing 502. The insert 540 is configured to dampen vibrations between the housing 502 and the light assembly 532 and between the light assembly 532 and the input shaft 504. The insert 540 may composed of an elastomeric material such as rubber, plastic, or another elastomeric or vibration damping material. The insert 540 includes a pocket 546 that receives a battery 548 and a recess 550 (which is transverse or perpendicular to the pocket 546) that receives a PCB 552. Mounted to the PCB 552 are an illuminating light (e.g., LED) 534, a switch 568, and a charging port 558 for receiving a charging cable to charge the battery 548. A light assembly cover 570 is received over a portion of the housing 502, the recess 550, the vibration damping member 538, the PCB 552, the battery 548, the light 566, and the switch 534, and may be substantially flush with the underside of the housing 502. The cover 570 may be transparent or translucent, or may have an opening or an opening, a clear cover, or a lens 571, to allow light from the LED 534 to illuminate the workpiece. The clear cover or lens 571 may be configured to transmit, redirect, focus, or diffuse light emanating from the LED 534. The cover 570 may be removable or otherwise configured to allow replacement of the battery. A button 572 (e.g., a pushbutton) may be received in a central opening 574 in the cover 570. The button 572 may include an elastomeric portion and may be depressed or other actuated to actuate the switch 568. The insert 540 includes a fully enclosed (e.g., O-shaped) opening 544 that surrounds the input shaft 504 when the insert 540 is received in the cavity 542. The vibration damping member 538 also may act as a seal to inhibit dust and debris from entering the electronic components of the light assembly 532 from an external environment. The input shaft 504 is supported by a rear bearing 590, which is mounted to a support ring 592 that is received in the rear end of housing 502 and that is coupled to the first engagement member 580. The first engagement member 580 can be coupled to one or more of the flexible orientation bit holder 700, the extension handle 800, or the side handle assembly 900, as discussed above.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the example implementations described above. These and other implementations are within the scope of this application.

What is claimed is:

1. An angled tool accessory holder comprising:
a housing;
an input shaft extending along a first axis and at least partially received in the housing, the input shaft coupleable to an output tool holder of a rotary power tool to be rotatable relative to the housing;
a tool accessory holder rotatable relative to the housing and extending along a second axis transverse to the first axis;
a transmission configured to transmit torque from the input shaft to the tool accessory holder;
a light assembly received in the housing, the light assembly including a light unit with a light configured to illuminate a workpiece adjacent the tool accessory holder and a vibration damping member dampen vibrations between the housing and the light unit, the vibration damping member comprising an insert received in the housing and defining a recess configured to receive the light unit.

2. The angled tool accessory of claim 1, wherein the light assembly includes a cover received configured to allow the light to illuminate the workpiece.

3. The angled tool accessory of claim 2, wherein the cover includes at least a portion that is transparent or translucent through which the light illuminates the workpiece.

4. The angled tool accessory of claim 2, wherein the cover includes an opening, a clear cover, or a lens through which the light illuminates the workpiece.

5. The angled tool accessory of claim 1, wherein the light assembly includes a switch for turning on and off the light.

6. The angled tool accessory of claim 1, wherein light assembly includes a timer for turning off the light a predetermined time after the light is turned on.

7. The angled tool accessory of claim 1, further comprising a battery configured to provide power to the light.

8. The angled tool accessory of claim 7, wherein the light assembly includes a charging port configured to receive a power cable to charge the battery.

9. The angled tool accessory of claim 1, wherein the insert comprises an elastomeric material.

10. The angled tool accessory of claim 9, wherein the insert includes a pocket configured to receive a battery that is configured to provide power to the light.

11. The angled tool accessory of claim 9, wherein the light unit includes a circuit board to which the light is mounted and the recess is configured to receive the circuit board.

12. The angled tool accessory of claim 9, wherein the insert includes an opening that receives at least a portion of the input shaft.

13. The angled tool accessory of claim 12, wherein the opening is U-shaped or O-shaped.

14. The angled tool accessory of claim 1, wherein the vibration damping member comprises a gasket that at least partially surrounds the light assembly.

15. The angled tool accessory of claim 1, further comprising a first connector non-rotatably coupled to a rear end portion of the housing, the first connector configured to be removably and non-rotatably couplable at least one of a second connector of a flexible shaft bit holder, a third connector of an extension handle, or a fourth connector of a side handle assembly.

16. The angled tool accessory holder of claim 1, further comprising a side handle assembly including a collar with a connector selectively non-rotatably coupleable to the housing and a side handle coupleable to the collar.

17. An angled tool accessory holder comprising:
a housing;
an input shaft extending along a first axis and at least partially received in the housing, the input shaft coupleable to an output tool holder of a rotary power tool to be rotatable relative to the housing;
a tool accessory holder rotatable relative to the housing and extending along a second axis transverse to the first axis;
a transmission configured to transmit torque from the input shaft to the tool accessory holder; and
a light assembly received in the housing, the light assembly including a light unit with a light configured to illuminate a workpiece adjacent the tool accessory holder and a vibration damping member configured to dampen vibrations between the housing and the light unit, the vibration damping member comprising an insert received in the housing and including an opening that receives at least a portion of the input shaft.

18. The angled tool accessory holder of claim 17, wherein the insert comprises a recess that is configured to receive at least a portion of the light unit.

19. An angled tool accessory holder comprising:
a housing;

an input shaft extending along a first axis and at least partially received in the housing, the input shaft coupleable to an output tool holder of a rotary power tool to be rotatable relative to the housing;

a tool accessory holder rotatable relative to the housing and extending along a second axis transverse to the first axis;

a transmission configured to transmit torque from the input shaft to the tool accessory holder; and a light assembly received in the housing, the light assembly including a light configured to illuminate a workpiece adjacent the tool accessory holder and a vibration damping member configured to dampen vibrations between the housing and the light assembly, the vibration damping member comprising potting compound configured to fill a cavity in the housing around the light assembly.

20. The angled tool accessory holder of claim 19, wherein the light assembly includes a circuit board to which the light is coupled.

* * * * *